United States Patent [19]
Tanner

[11] Patent Number: 5,868,995
[45] Date of Patent: Feb. 9, 1999

[54] DYNAMIC MINING SYSTEM COMPRISING HYDRATED MULTIPLE RECOVERY SITES AND RELATED METHODS

[75] Inventor: Noel Tanner, Lakeshore, Utah

[73] Assignees: Rennat Trust; A.U. Mines, Inc., both of Calgary, Canada

[21] Appl. No.: 749,872

[22] Filed: Nov. 15, 1996

Related U.S. Application Data

[62] Division of Ser. No. 392,460, Feb. 21, 1995, Pat. No. 5,617,955, which is a division of Ser. No. 212,745, Mar. 14, 1994, Pat. No. 5,544,756.

[51] Int. Cl.$^6$ ................................................ B03B 5/06
[52] U.S. Cl. ...................... 266/101; 266/170; 209/458
[58] Field of Search .................................. 266/101, 170; 209/458, 485, 506

[56] References Cited

U.S. PATENT DOCUMENTS

| | | | |
|---|---|---|---|
| 386,030 | 7/1888 | Rae | 209/506 X |
| 717,301 | 12/1902 | Telford | 209/507 |
| 804,408 | 11/1905 | Johnson | 209/507 |
| 1,037,809 | 9/1912 | Van Eyck | 209/490 |
| 1,050,598 | 1/1913 | Bassett | 209/506 |
| 1,103,390 | 7/1914 | Wright | 209/507 |
| 1,364,991 | 1/1921 | Hayes, Jr. | 209/507 |
| 1,516,640 | 11/1924 | Meyer | 209/485 |
| 1,987,475 | 1/1935 | Hanson | 209/485 |
| 2,015,522 | 9/1935 | Hoffman | 209/506 |
| 2,064,000 | 12/1936 | Hartman | 209/485 |
| 2,183,157 | 12/1939 | Swedman | 209/506 |
| 2,269,307 | 1/1942 | Dickerson | 209/507 |
| 2,355,374 | 8/1944 | Herbert | 209/458 |
| 2,944,668 | 7/1960 | Stephan | 209/507 |
| 3,143,495 | 8/1964 | Stephan | 209/506 X |
| 3,950,246 | 4/1976 | Klefisch | 209/485 |
| 3,970,551 | 7/1976 | Wright et al. | 209/506 X |
| 4,253,943 | 3/1981 | Thrasher | 209/506 |
| 4,290,527 | 9/1981 | Wright | 209/506 X |

(List continued on next page.)

FOREIGN PATENT DOCUMENTS 787090  9/1935  France ................................ 209/506

OTHER PUBLICATIONS

Literature from R. A. Hanson Company, Inc., entitled Mineral Jigs (No Date).
Literature from Hewitt–Robins on Crushing and Vibrating Equipment (No Date).
Literature from Hewitt–Robins on Coal Processing and Car Shake–Outs (1 page) (No Date).
Literature from Hewitt–Robins on V–Line Vibrex Screens (No Date).
Literature from Hewitt–Robins on Eliptex Screens and Dewaterizers (No Date).
Literature from Hewitt–Robins entitled Eliptex Vibrators: Famous For Reliability (No Date).
Catalog No. 115–D from Hewitt–Robins entitled Gyrex Vibrating Screens (No Date).
Literature from Hewitt–Robins on the Vibrex Heavy Duty Scalper (No Date).
Literature from Hewitt–Robins on Eliptex Extra–Heavy–Duty Feeders (No Date).

(List continued on next page.)

*Primary Examiner*—Scott Kastler
*Attorney, Agent, or Firm*—Foster & Foster

[57] ABSTRACT

A mining system and related methods are disclosed by which gold and/or other heavy metals are recovered at multiple sites along a continuously hydrated ore processing route. The gold-bearing ore and primary or carrier water are dynamically and circuitously displaced to segregate the gold, and precipitate the gold particles into predetermined recovery sites along the flow path of the mix. Boil box recovery sites are selectively provided for recovery of nuggets and smaller particles. Secondary water churns and disrupts the primary carrier flow of the mix through each boil box. Availability and reuse of massive amounts of carrier and secondary water are important.

15 Claims, 12 Drawing Sheets

U.S. PATENT DOCUMENTS

| | | | |
|---|---|---|---|
| 4,760,656 | 8/1988 | East | 37/57 |
| 4,863,588 | 9/1989 | Herron | 209/507 |
| 4,962,858 | 10/1990 | Newman et al. | 209/485 |
| 5,544,756 | 8/1996 | Tanner | 209/458 |
| 5,617,955 | 4/1997 | Tanner | 209/458 |

OTHER PUBLICATIONS

Literature from Hewitt–Robins on the Varex SR Feeder (No Date).

Literature from Hewitt–Robins on Eliptex Custom–Designed Foundry Shakeouts (No Date).

Literature from Hewitt–Robins on Floatex Foundry Shakeouts Medium–Heavy Duty (No Date).

Literature from Hewitt–Robins on Heavy Duty HDV Car Shakeout (No Date).

Literature from Hewitt–Robins on Trackside Car Shakeout (No Date).

Literature from Hewitt–Robins on Grizzly King Jaw Crushers Extra–Heavy–Duty (No Date).

Literature from Hewitt–Robins on Rock Ram Jaw Crushers (No Date).

Literature from Hewitt–Robins on Double Roll Crushers (No Date).

Literature from Hewitt–Robins on Impact Crushers (No Date).

Literature from Hewitt–Robins entitled Hewitt–Robins Hammermills (No Date).

Literature from Hewitt–Robins on the 425 Vari–Cone Crusher (No Date).

Article from Hewitt–Robins entitled Endless Moneymaker (No Date).

Literature from Hewitt–Robins entitled Coal Crusher (No Date).

Literature from Hewitt–Robins on Portable Primary Jaw Plants (No Date).

Literature from Hewitt–Robins on Portable Impactor Plants (No Date).

Literature from Hewitt–Robins on Portable Hammermill Plant (No Date).

Literature from Hewitt–Robins on Portable Screening Plants (No Date).

Literature from Hewitt–Robins on Portable Coal Crushing Plant (No Date).

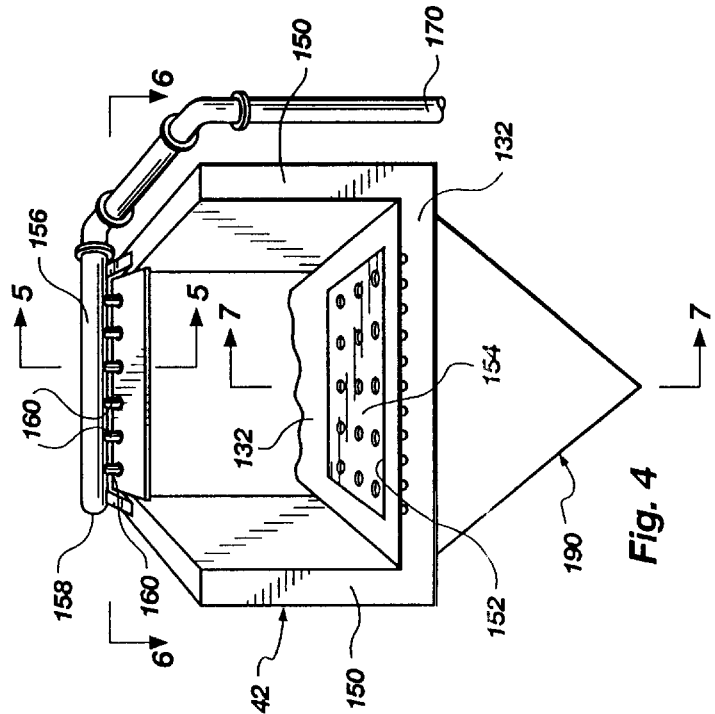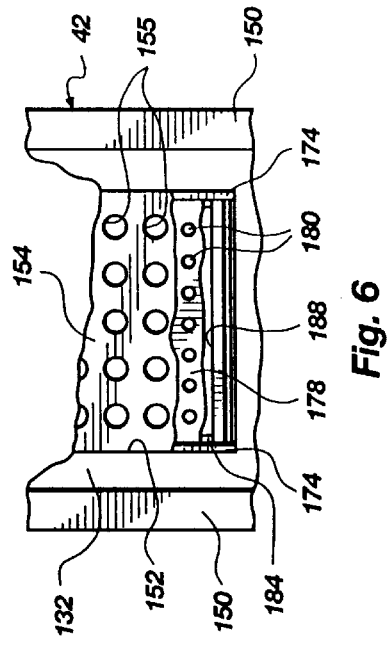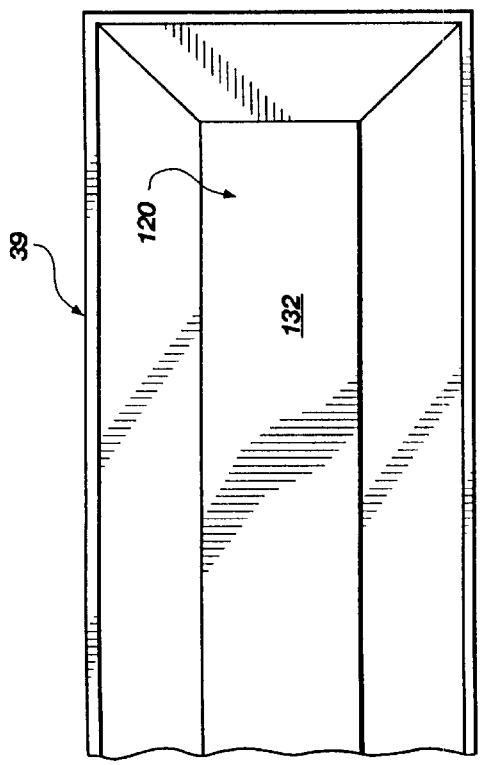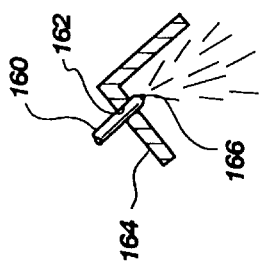

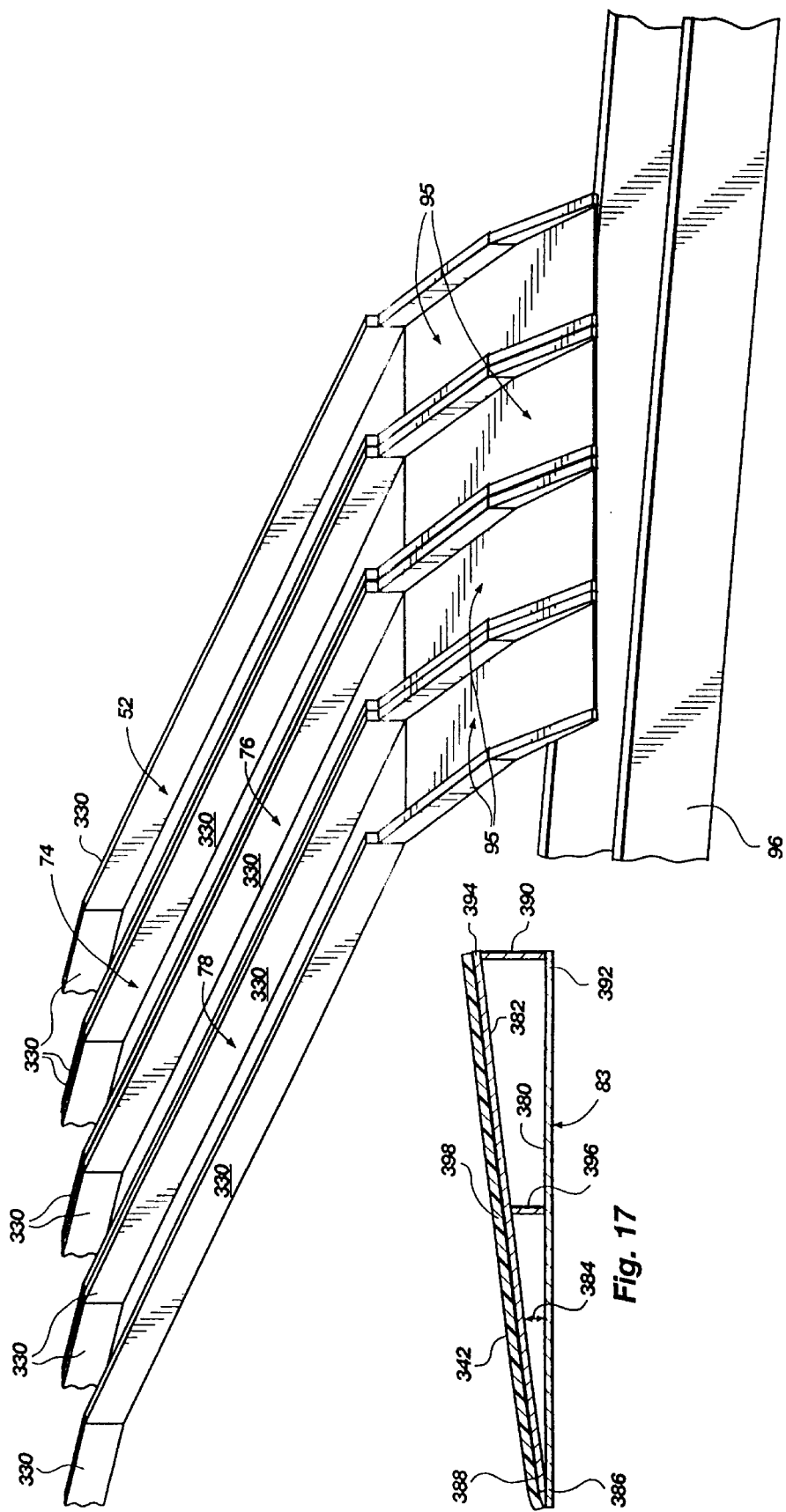

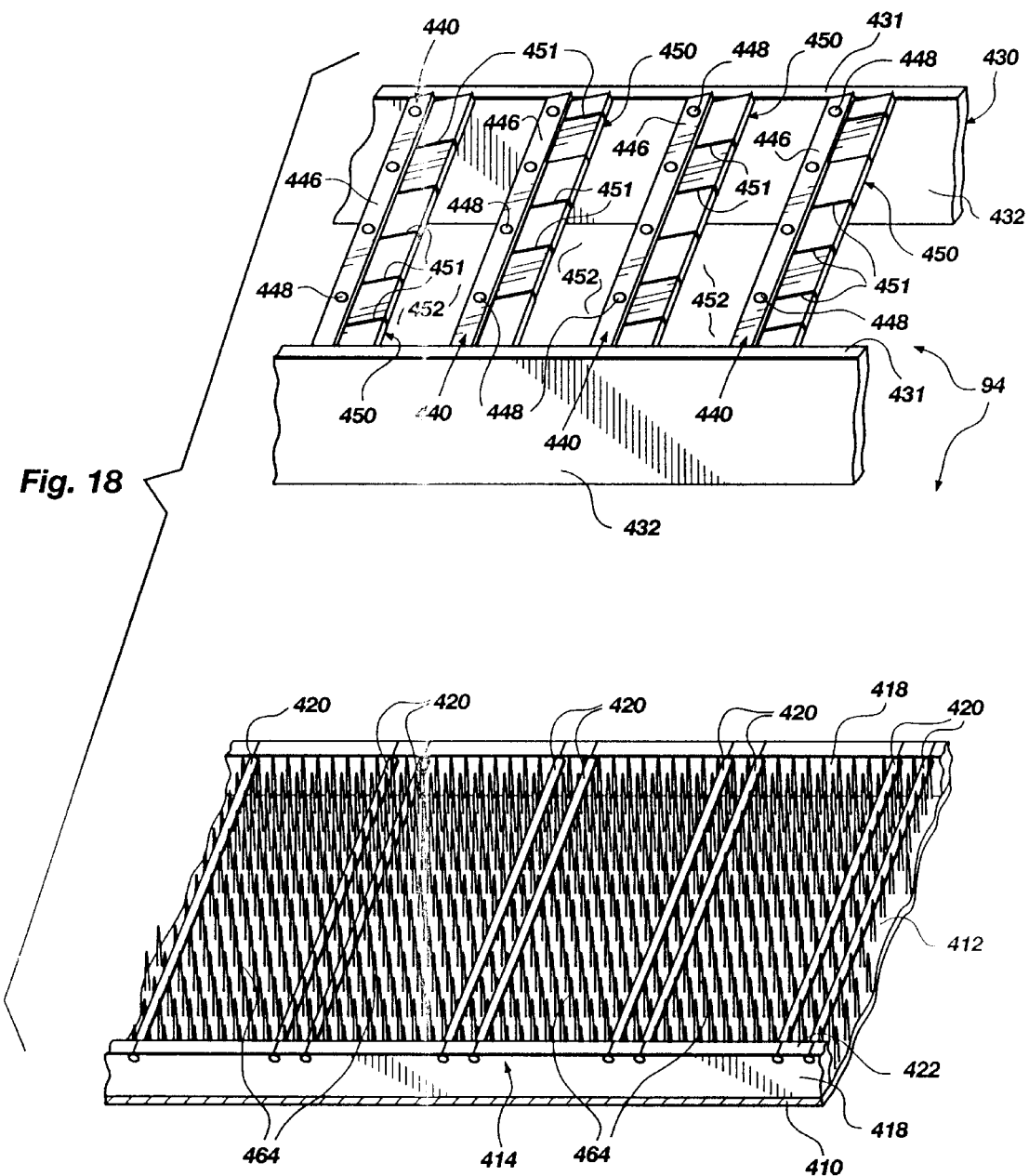

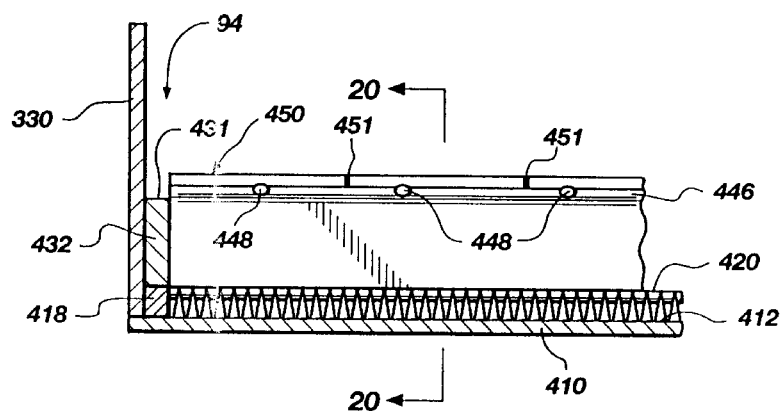
Fig. 19
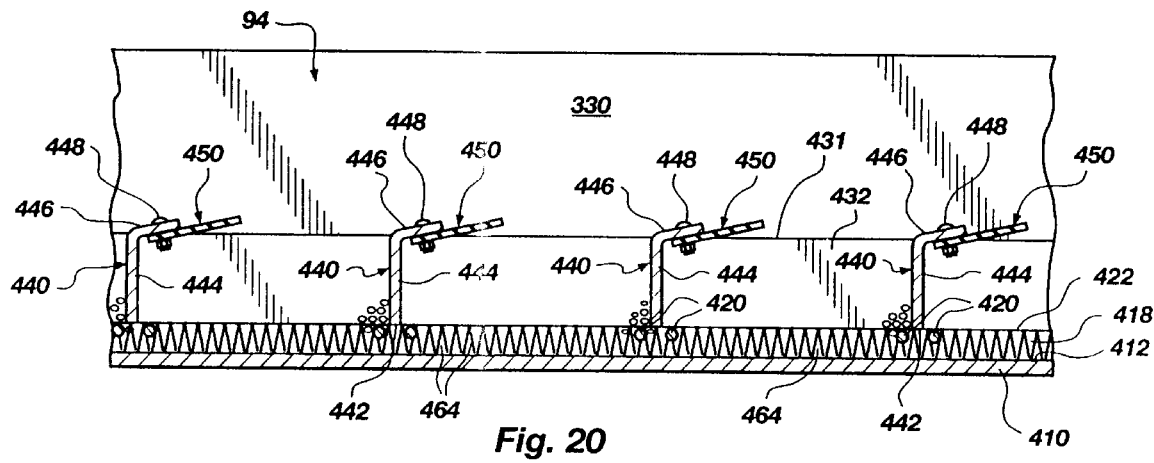
Fig. 20
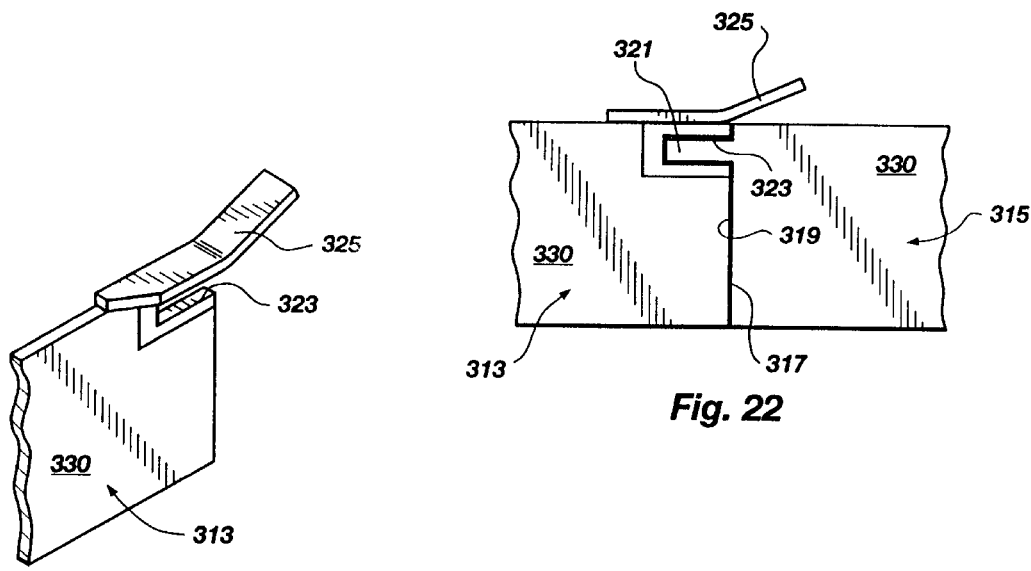
Fig. 22
Fig. 23

DYNAMIC MINING SYSTEM COMPRISING HYDRATED MULTIPLE RECOVERY SITES AND RELATED METHODS

This application is a division of my co-pending U.S. patent application Ser. No. 08/392,460, filed Feb. 21, 1995, now U.S. Pat. No. 5,617,955, which is a division of Ser. No. 08/212,745, filed Mar. 14, 1994, now U.S. Pat. No. 5,544,756.

FIELD OF INVENTION

The present invention relates to mining and, more particularly, to a novel dynamic mining system for the recovery of gold and/or other heavy precious and non-precious metals having hydrated multiple recovery sites, and related methods. When the term "gold" is used in this Specification, it is to be understood that it has application to gold as well as other precious and non-precious heavy metals.

BACKGROUND

Recovery of gold through various placer mining techniques is generally well known and has been for a very long time. Sluice box recovery is, perhaps, the best known prior way to placer mine.

Heretofore, various forms of placer mining have been both expensive and relatively inefficient, leaving a substantial amount of non-recovered gold in waste, tramp, discarded, or spent ore.

The mining industry has sought, largely in vain, to find an efficient system and methods by which a significantly high percentage of gold can be recovered from ore in a cost-effective way, independent of whether the ore is being processed for the first time or is being reprocessed.

BRIEF SUMMARY AND OBJECTS OF THE PRESENT INVENTION

In brief summary, the present invention overcomes or substantially alleviates the aforesaid problems of the prior art. In its most fundamental aspects, the present invention comprises a mining system, and related methods, by which gold and/or other heavy metals are recovered at multiple sites along a continuously hydrated ore processing route. Recovery is based significantly upon sizing of ore, dynamic hydration of ore, creating a mix of ore, the element to be recovered, such as gold, and primary or carrier water, which mix is dynamically and circuitously displaced to segregate the gold, and separation through agitation and downward specific gravity displacement of the gold particles into predetermined recovery sites along the flow path of the mix. Various techniques are employed at the several recovery sites that either enhance turbulent separation of the gold from the remainder of the ore or accommodate downward migration of gold particles at each recovery site or both.

Boil box recovery sites are selectively provided for recovery of nuggets and smaller gold particles. Secondary water churns and disrupts the primary carrier flow of the mix through the boil box. The depth of each boil box is typically greater than the depth of upstream and downstream flow path-defining structure. Each boil box comprises at least one chamber in which precipitated gold particles are collected and from which the gold is periodically recovered.

Where appropriate, screens or apertured plates of steel, plastic or both, can be used to size, segregate, and recover gold.

Dynamic displacement of sized ore in rapidly flowing carrier water, in very large rapidly flowing quantities, is an important feature of the invention. Availability and reuse of the massive amount of carrier and secondary water are, therefore, important for some aspects of the present invention. Water not only serves as a dynamic carrier and hydrator for the ore, but is used in a secondary fashion to selectively turbulate the gold-ore-carrier water mix to enhance separation and sedimentation of gold particles. Water also serves to initially remove surface gold from influent ore, preferably prior to any sizing of the ore.

The master stream of gold-sized ore-primary water mix, in one embodiment, is subdivided into several separate streams or substreams. A splitter may be used to create the substreams. The substreams are violent in nature, with one exception, and are typically contained in man-made canal-forming troughs comprising multiple recovery sites, at least one of which comprises a boil box. Another recovery site may comprise one or more drop slots, which typically are diagonally oriented across the associated substream. At least some, if not all, of the slots may be subjected to a downward draw caused by flow of secondary water in a conduit located below, but in communication with a given slot. Mineral jigs may be used to recover gold segregated at selected slot recovery sites.

Each trough comprises a dynamic segregation box comprising successive compartments across which a top layer of turbulent flow continuously occurs during operation. Within each compartment, during use, a bottom layer of laminar flow takes place not only within each compartment, but from compartment-to-compartment.

The laminar flow at the bottom of the trough is damped by yieldable baffle elements, which may be blades of synthetic resinous carpet. Smaller particles of gold, accordingly, settle between the blades or yieldable baffle elements.

A violent central, middle or immediate layer of turbulent flow occurs between the top unobstructed turbulent layer and bottom laminar layer of trough flow. This middle layer is caused to revolve upon itself within each compartment. Rigid barriers at each end of each compartment preferably do not accommodate direct middle layer flow between compartments. Instead, middle layer flow from one compartment to another is preferably limited to displacement down into the bottom laminar flow layer or up into unobstructed top turbulent flow layer. Within each compartment, the turbulence of the middle flow layer revolves or comprises eddy currents enhanced by a whipping action caused by yieldable flaps or flap segments that dynamically oscillate up and down with the flow of the mix through the trough. This vigorous action segregates the gold particles from the other solids within the mix, which gold particles, including nuggets, and driven downwardly and settle to the bottom of the compartment, the larger ones of said gold particles being pushed by the trough flow against the downstream compartment barrier.

The splitter may be valved so that flow to any selected trough may be temporarily stopped to allow removal of accumulated gold.

Slime or silt containing micro-fine gold is separated from trough-discharged waste solids and the slime is collected in at least one and preferably several clarifying-sedimentation ponds or reservoirs, from which water is reclaimed, recirculated, and reused. The sedimentary solids deposited in the clarifying-sedimentation ponds are later salvaged for application of secondary recovery methods by which the micro-fine gold is recovered.

With the foregoing in mind, it is a primary object of the present invention to overcome or substantially alleviate prior gold and other heavy metal recovery problems.

Another principal object of the present invention is the provision of a mining system, and related methods, by which gold and/or other heavy metals are recovered.

An additional dominant object of the present invention is the provision of a placer mining system, and related methods, comprising multiple sites for gold recovery along one or more continuously hydrated processing routes.

An additional significant object of the present invention has to do with provision of a system and methods for sizing of gold-bearing ore and dynamic hydration of the sized ore to create a mix of ore, gold, and carrier water which mix is dynamically and circuitously displaced to isolate the gold, based on separation through agitation and downward specific gravity displacement of the gold particles into a variety of recovery sites along the flow path of the mix.

An additional important object of the present invention comprises provision of a mining system and methods comprising multiple recovery sites where separation of gold from the remainder of the ore is turbulently enhanced and downward migration of the gold particles at the several recovery sites is efficiently accommodated, on a cost-effective basis.

An additional paramount object of the present invention is the provision of a placer mining system comprising boil box recovery sites, and related methods, by which gold nuggets and smaller gold particles are recovered.

An additional object of value is the provision in a novel mining system, in a boil box context, of secondary water that dynamically churns and disrupts primary carrier flow for dynamic separation of the gold from non-gold ore particles.

A further object of significance is the provision of sizing and segregation sites in a gold recovery system for both the raw ore and gold contained within the ore.

An additional object of paramount importance is the provision in the gold placer mining system of dynamic displacement of sized ore in rapidly flowing carrier water, and related methods.

An additional object of importance is the provision and reuse of massive amounts of carrier and secondary water in the recovery of gold from ore at multiple recovery sites.

An additional valuable object of the present invention is the provision of dynamic displacement of ore in selectively turbulated water to enhance separation and sedimentation of gold particles.

An additional dominant object of the present invention is the utilization of water spray upon influent ore to insure removal of surface gold from the ore.

Another paramount object of the present invention is the provision in the gold mining system, and related methods, of a master stream comprised of gold, sized ore, and primary carrier water mixed together, which master stream is separated into streams or substreams for gold-removal processing.

An additional object of significance is the provision in a placer mining system, and related methods, of a hydrated ore flow divider or splitter by which a main stream of hydrated ore is subdivided into smaller streams for gold recovery purposes.

An additional object of value is the recovery of gold through the utilization of massive quantities of water in which the ore being processed is hydrated and the combination flows turbulently as one or more streams under force of gravity, to accommodate separation and sedimentation of gold at predetermined gold recovery sites along the flow path.

An additional primary object is the provision of a gold mining system, and related methods, wherein one or more streams of water containing gold-bearing ore are violently displaced along a trough or canal comprised of multiple gold recovery sites.

An additional object of value is the provision of gold recovery drop slots at or near an influent to a trough.

An additional object of paramount significance is the provision in a placer mining system of gold recovery drop slots selectively positioned at the bottom of a flow path for water containing gold-bearing ore wherein secondary flow below at least some of the drop slots draws gold particles downwardly away from the main stream.

It is a primary object of the present invention to provide at least one and preferably several troughs in which water containing gold-bearing ore is dynamically displaced into and through successive compartments to enhance recovery of gold.

Another object of importance is the provision of at least one gold recovery dynamic segregation box in which water containing gold-bearing ore is vigorously displaced into and out of successive compartments to enhance recovery of gold.

It is a further object of significance to provide at least one trough or canal for receiving water in which gold-bearing ore is disbursed and carried as a stream, the trough comprising a dynamic segregation box in which flow is laminar near the bottom, turbulent although recirculating in nature in an intermediate portion of the stream, and turbulent near the top of the stream.

An additional object of dominance is the provision in a gold mining system, and related methods, of a dynamic gold recovery box or trough through which a substantial stream of water having gold-bearing ore therein flows where the flow is turbulent except near the bottom and laminar flow near the bottom is engaged by yieldable baffle elements or blades that enhance sedimentation of gold particles between the blades or yieldable baffle elements.

It is an additional object of the present invention to provide for at least one and preferably several compartmentized troughs, boxes, or canals in which water containing gold-bearing ore is dynamically and violently displaced such that each compartment induces turbulent revolving flow to enhance separation and sedimentation of gold particles within each compartment.

An additional object of value is the provision of at least one and preferably several compartmentized troughs, boxes, or canals in which water containing gold-bearing ore is dynamically displaced such that yieldable flaps or flap segments dynamically oscillate up and down to further turbulate the flow thereby enhancing separation and sedimentation of gold particles from other solids within each compartment.

It is a further object of importance to segregate slime or silt at the effluent of a gold recovery system and to use secondary recovery methods to recovery micro-fine gold from the slime or silt.

It is a further object of the present invention to utilize one or more clarifying-sedimentation ponds or reservoirs to separate solid fines from water discharged from a gold recovery system.

These and other objects and features of the present invention will be apparent from the detailed description taken with reference to the accompanying drawings.

BRIEF DESCRIPTION OF THE DRAWINGS

FIG. 3 is a plan view taken along lines 3—3 of FIG. 2;

FIG. 4 is an elevation taken along lines 4—4 of FIG. 2;

FIG. 5 is an enlarged fragmentary cross-section taken along lines 5—5 of FIG. 4;

FIG. 6 is an enlarged fragmentary plan view, with parts broken away for clarity, taken along lines 6—6 of FIG. 4;

FIG. 16 is a fragmentary perspective representation of the troughs, with the compartment forming barriers, flaps, rods and carpet removed for clarity of illustration, through which the four substreams flow between the grizzly-scalper and the sump illustrated in FIG. 1;

FIG. 17 is a cross-sectional view taken along lines 17—17 of FIG. 12 of a ramp disposed at the influent end of each trough through which one substream flows;

FIG. 18 is an exploded fragmentary perspective of the compartment-forming barriers, flaps, rods, and carpet disposed within each dynamic segregation box between the slotted plate section and the sump;

FIG. 19 is an enlarged fragmentary elevational view showing part of one compartment of a dynamic segregation box;

FIG. 20 is a cross-section taken along lines 20—20 of FIG. 19;

FIG. 22 is an elevational view showing a presently preferred releasible, interlocking structure by which the dynamic segregation box when formed in sections can be assembled and disassembled;

FIG. 23 is a fragmentary perspective view of the female interlocking structure of one section of a dynamic segregation box illustrated in FIG. 22.

DETAILED DESCRIPTION OF THE ILLUSTRATED EMBODIMENTS

The Presently Preferred Overall System

Reference is now made to the drawings wherein like numerals are used throughout to designate like parts. Specific reference is made to FIG. 1 which diagrammatically or schematically illustrates, in flow chart form, a presently preferred overall system, generally designated 30, incorporating various principles of the present invention. System 30 will be described in respect to recovery of gold, but it should be understood that the principles of the present invention and the various modes of operation and mechanisms described herein also apply to the recovery of other heavy metals, both precious and non-precious. While system 30 is shown as being supported directly upon the ground, it is to be appreciated that in other configuration it may be supported upon wheeled vehicles, or upon a dredge, or in other ways.

A continuous supply of water is an important aspect of the present invention. To utilize the present invention in an efficient way, an extremely large volume of available water is important. In many configurations, the best placement of the large supply of processing water is in a large reservoir or pond 34, to which both supplemental water and reclaimed process water is introduced. More particularly, in reference to FIG. 1, water is initially obtained from any suitable source 32, which may be a stream, river, well, spring, naturally-occurring lake, man-made reservoir, pond, or several of the individual or collective sources mentioned. It is to be understood, therefore, that water source 32 may be any source or combination of sources from which water may be obtained.

Figure 1:
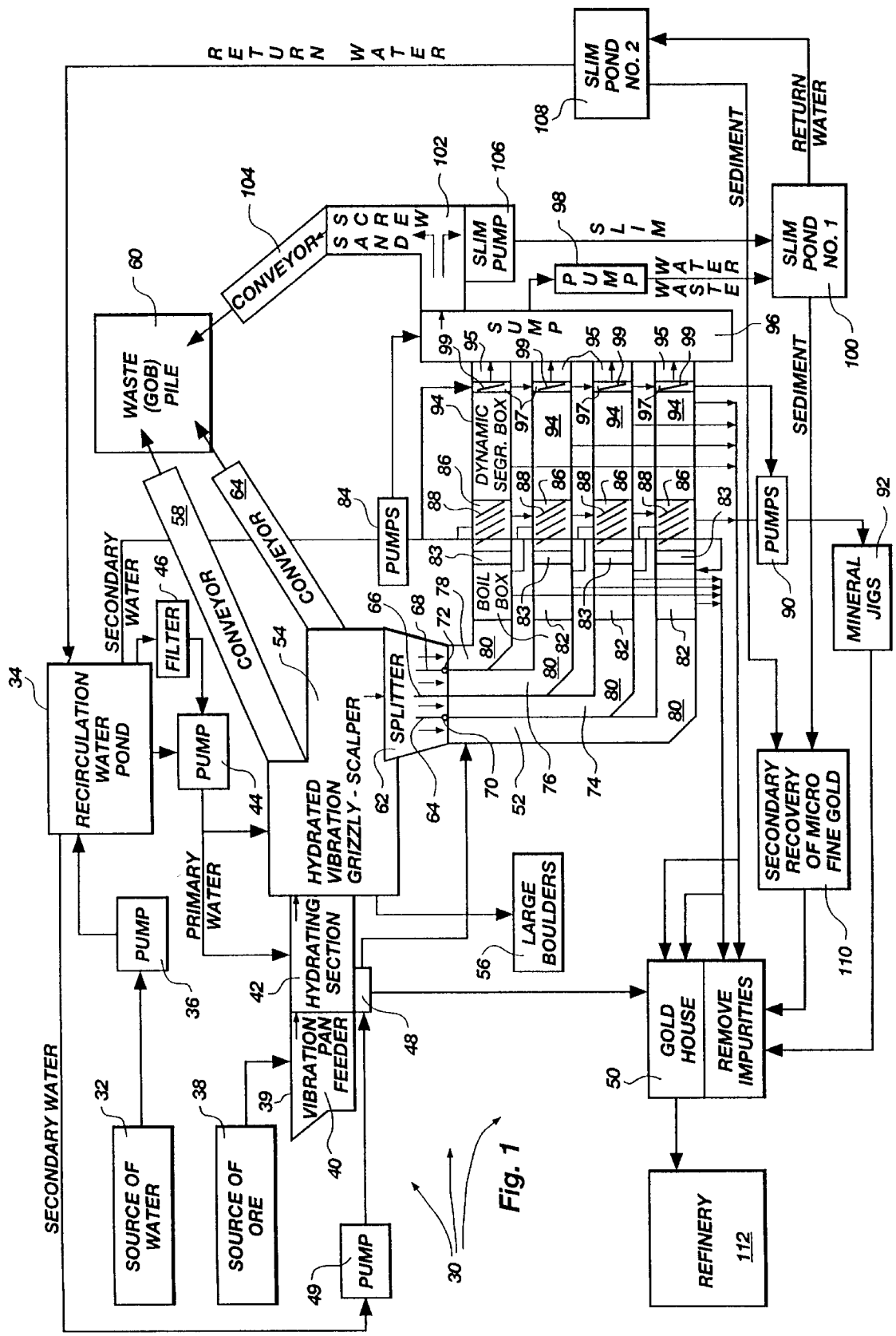
FIG. 1 is a mining system flow diagram for recovery of gold and/or other heavy metals, illustrating one embodiment by which the principles of the present invention may be carried out.

Thus, in the configuration illustrated in FIG. 1, the man-made, relatively large recirculation water pond 34 is provided. The capacity of water pond 34 is selected so as to accommodate the particular size of gold-recovery operation contemplated for a particular locality, depending upon the demographics, upon funding available for the gold-recovery operation, and other factors. Accordingly, the size of pond 34 can vary from operation-to-operation and from configuration-to-configuration.

Recirculation water pond 34 may be formed by man-made earth barriers or other types of barriers, such as concrete, to provide a cavity or crater having the size necessary to accommodate the amount of water essential for the recovery operation. Once the cavity in the earth for pond 34 has been established or created, it is filled with water. For example, water from source 32 may be displaced by pump 36 or otherwise caused to flow into the cavity for pond 34. This may take a protracted interval of time, consuming up to several days. When the recirculation pond 34 is filled to a desired level, and the remainder of the system 30 is operational, the gold recovery process can commence.

Also, essential to the present invention is a source of ore 38. The ore from the source 38 is ordinarily delivered to the system 30 by one or more known earth moving techniques, such as use of bulldozers, front-end loaders, scrapers, drag lines, backhoes, etc. The ore from the source 38 will typically be raw, non-segregated ore, which is discharged into an ore ingress site of system 30. More specifically, in respect to FIG. 1, the ore is dumped into an upper hopper 39 of a vibration pan feeder 40 and is moved along a sloped, vibrating plate through a hydrating section 42. Primary water from pond 34 is delivered to hydrating section 42 by a relatively large, high volume pump 44, preferably across a filter 46. Pump 44, for the configuration of the invention shown in FIG. 1, is preferably a 10"–12" large capacity pump capable of delivering 4,000 gallons of water per minute to hydrated vibration grizzly-scalper 54 and ample water as well to hydrating section 42. The water delivered to hydrating section 42 is sprayed forcibly at high pressure from an overhead position upon the raw ore as it moves through the hydrating section 42. Such spraying removes surface gold from the ore.

Hydrating section 42 is equipped with a primary boil box mechanism 48, from which large and intermediate sized nuggets are recovered and delivered to gold house 50. Secondary water, illustrated as being derived from pond 34 via pump 44, is introduced into boil box 48 to enhance recovery of gold at that site. Primary boil box 48 also generates a separate effluent of water, relatively small pieces of ore and gold sediment, which is collected and periodically delivered to a first trough 52 for gold recovery, as hereinafter more fully explained.

The main ore-water effluent from hydrating section 42 (exclusive of that discharged into boil box 48) is delivered to hydrated vibration grizzly-scalper 54, which is a two-deck ore segregator, in the illustrated embodiment.

A large volume of water from pond 34 is delivered by pump 44 to grizzly-scalper 54, where it is vigorously and forcefully sprayed from overhead nozzles upon the moving ore to further remove surface gold therefrom and to increase the quantity of water mixed with the ore so that the water can function as a primary carrier of the ore through the remainder of the system 30.

As illustrated, grizzly-scalper 54 separates the ore into four parts. Very large boulders move across the top deck of the grizzly-scalper 54 and are displaced from a chute to large boulder site 56. The boulders may be left at site 56 or hauled away in a conventional manner, depending upon the number of boulders so segregated, the size and nature of site 56, and other factors.

The top deck of grizzly-scalper 54 comprises a segregator by which pieces of ore smaller than the very large boulders discharge to site 56, but larger than a first predetermined size, for example, about four inches, are separated from the remainder of the ore and displaced along conveyor 58 to a waste pile 60, where this waste ore is accumulated, or hauled away as deemed appropriate in the operation of system 30.

Ore less than the first predetermined size, for example about four inch, down to no more than a second predetermined size, for example one and one-half inches in the illustrated embodiment, is displaced through the top deck segregator to the bottom deck of grizzly-scalper 54.

The lower deck of grizzly-scalper 54 passes hydrated ore no greater than a third smaller predetermined size, for example about three-quarter inch, therethrough to a splitter 62, with ore particles having a size between the second and third predetermined sizes being displaced across the lower deck of grizzly-scalper 54 to a conveyor 64 and from thence to waste pile 60.

Thus, the mixture of ore and water processed through the remainder of the recovery system 30 is introduced into splitter 62 flows collectively as a fluid. This mixture comprises ore pieces no greater than the third predetermined size, for example about three-quarters of one inch. As illustrated, splitter 62 is a flow divider by which the effluent to be processed from grizzly-scalper 54 is subdivided into four separate streams or substreams of similar or substantially the same volume of flow. These streams are created by upwardly-directed flow dividers 64, 66, and 68 as well as the sidewall of the splitter 62. Flow dividers 64 and 68 are pivotally mounted, respectively, at hinges 70 and 72. Divider 66 is fixed in its position. Each flow divider 64 and 66 may be selectively pivoted to prevent flow along a selected one of the four flow paths to accommodate periodic manual removal of gold particles therefrom, as hereinafter explained in greater detail. The four streams of water and ore which are discharged from splitter 62 are respectively turbulently displaced under force of gravity along four sloped troughs, i.e., troughs 52, 74, 76, and 78, respectively. The streams or flow of ore and water through each trough 52, 74, 76, and 78 are and, with one exception, remain dynamic and turbulent, in a manner explained hereinafter in greater detail. Each trough 52, 74, 76, and 78 is illustrated as traversing through a 90° angle, at site 80, before crossing a plurality of gold recovery locations forming a part of or disposed within each trough.

The initial gold recovery site in each trough comprises a trough boil box 82. Each boil box 82, in the illustrated configuration, has a depth extending below adjacent flow confining structure in the associated trough. Consequently, the ore and water mixture being displaced through each trough will tumble downwardly into each boil box as secondary water from pond 34 (or any other source) is delivered under high pressure via one or more pumps 84 to each boil box 82. It is to be appreciated that while pumps 84 are shown collectively, an individual supply line and an individual pump may be used, respectively, to supply secondary water to each boil box 82. The secondary water is introduced under high pressure, preferably counter to the flow of the mixture of carrier water and ore along the trough, so as to enhance turbulence in the boil box 82 and thereby stimulate separation and precipitation of gold particles into the lowest region of the boil box 82, where the gold is collected and retrieved. The collection site of each boil box 82 is emptied from time-to-time and the recovered gold content thereof delivered to the gold house 50, nuggets without any requirements that impurities be removed and smaller gold particles with the requirements that known processes be used to remove impurities.

The carrier water-ore mix discharged from each boil box 82 is thereafter displaced under force of gravity over a velocity plate 83 and thereafter along the associated trough at substantial velocity through a slotted section 86 comprising a plurality of diagonally oriented slots 88 of a predetermined size. Secondary water from pond 34 or any other suitable source is delivered under high pressure to each slotted section 86, as diagrammatically illustrated in FIG. 1. Specifically, pumps 84 deliver high pressure secondary water to a conduit at the underside of each slot 88 diagonally disposed in each slot section 86. Accordingly, the heavier gold particles fall and are drawn by a hydraulic force into slots 88. The hydraulic force is created by the flow of secondary water beneath each slot. High pressure secondary water can be supplied either collectively to all slot sections 86 or individually to each slot section 86.

The effluent flowing downwardly through the slots 88 of each slot section 86 is displaced with the aid of one or more pumps 90, if necessary, to a set of commercially available mineral jigs 92, where gold particles equal to and below a certain size are recovered and from thence delivered to the gold house 50 where remaining impurities are removed. Typically, the set of mineral jigs 92 pass gold equal to and smaller than ten mesh. In most configurations, each slotted section 86 will have its own discharge tube, its own pump 90, and at least one but preferably a series of mineral jigs 92 through which the slot effluent from each slotted section 86 is passed to recover the gold contained therein.

Effluent carrier water and ore exiting each slot section 86, exclusive of discharge through the slots 88, is communicated next across a ramp or velocity plate section 83 and thereafter along the associated trough through a dynamic segregation box 94. The flow of water and ore through each dynamic segregation box 94 is subdivided into three layers, i.e., a bottom layer, which is laminar, an intermediate revolving, turbulent, and compartmentized layer, and a top unobstructed turbulent layer.

The intermediate flow layer is not continuous along the trough through the dynamic segregation box, but is formed primarily from carrier water and ore initially primarily derived from the top flow layer. Compartments disposed within the middle flow layer are defined by middle flow layer impervious barriers disposed transversely of the trough and located successively along the dynamic segregation box. Structural angles are preferred, where each barrier comprises a one generally vertically disposed leg of the angle. Each barrier does not accommodate direct middle layer flow from compartment to compartment. Middle layer flow in one compartment must first move into the top and bottom flow layers, respectively, to traverse from one compartment to the next consecutive compartment.

Within each compartment, between successive barriers, the middle layer flow is revolving and highly turbulent. This flow is enhanced by yieldable fins, paddles, flaps or flippers, which vigorously are caused to move up and down responsive to the dynamics of flow in the top layer and the adjacent middle layer. In the illustrated configuration, a transversely directed, longitudinally extending flap is carried or attached at the top of each compartment-forming barrier. Thus, each flap extends transverse of flow, but is cantilevered in a longitudinal upward and downstream direction. The oscillating or whipping motion of the paddle, fin, flap, or flipper enhances separation of gold particles from the remainder of the ore and sedimentation of the gold particles from the middle flow layer into the bottom flow layer. Because of the nature of the complex flow through each dynamic segregation box and particularly within each compartment thereof, gold nuggets are driven downstream in a given compartment against the downstream barrier and accumulate at and below the lowest portion of the barrier.

The bottom laminar flow layer occurs through upstanding yieldable fingers or blades, which damp the flow and cause smaller gold particles contained therein to accumulate between the blades. Pairs of rods extend transversely within the bottom laminar flow layer and are juxtaposed fore and aft of each barrier. Laminar flow between compartments in the bottom layer thus occurs over and under the transverse rods.

As stated earlier, the flow to any of the troughs may be temporarily discontinued by manually rotating one of the valve members 64 or 68 in splitter 62 to shut the flow thereto off, following which gold accumulated immediately upstream of each compartment barrier and between the upstanding blades is manually recovered and delivered to the gold house 50, the nuggets requiring no removal of impurities, while the gold collected between the blades requiring conventional removal of the impurities to obtain pure gold. The flow in any desired trough may be so discontinued when repairs to a given trough are needed. When any trough so taken out of service is ready for use thereof to resume, the associated valve member 64 or 68 is reverse manually rotated to the upright position shown in FIG. 1.

A second slotted section 97 comprising a single slot 99 is disposed at the discharge end of each trough 52, 74, 76, and 78. Each slot 99 is constructed and operates essentially the same as each slot 88.

The trough effluent from each dynamic segregation box 94, exclusive of the discharge through slot 99, is discharged down a spillway 95 into a sloped sump 96. Some of the spent carrier water and residual fine solids so introduced into the sump is removed by a water and fines drain mechanism and delivered by pump 98 (or by gravity) to a first slime pond 100. The remainder of the spent ore and water passes from the sump 96 to a conventional sand screw 102, which separates the remaining silt or slime and water from the larger solids. The larger waste solids are delivered by sand screw 102 to the waste pile 60 via a conveyor 104. The remaining slime or silt and the water mix delivered to the sand screw 102 is displaced by a conventional slime pump 106 to the first slime pond 100.

Where the terrain permits, it is preferable that hydrating section 42, grizzly-scalper 54, the splitter 54, troughs 52, 74, 76, and 78 and sump 96 be located at a relatively high elevation. The first slime pond 100 is preferably located at a lower elevation such that pump 98 can be eliminated, if desired, and water drained by gravity from sump 96 into the first slime pond 100.

Typically, the first slime pond and any other slime pond are cavities formed or existing in the surface of the ground. They are sized to receive a predetermined amount of water and fine material, called slime or silt, in which micro-fine gold particles exist. Each slime pond may comprise a discharge weir, where the weir is progressively elevated as the amount of water and slime accumulate in the associated slime pond.

Slime pond 100, as is true of all other slime ponds used as part of the system 30, serves to clarify the water therein and precipitate or settle the fine solid particles as a sediment. As the quantity of fines increases, the water capacity of the pond is enlarged by elevating the weir; with the water flowing over the weir into one or more successive ponds, such as slime pond 108. Ultimately, any slime pond will become substantially full of fines and the capability of the pond to receive and clarify the water decreases. While only two slime ponds are illustrated in FIG. 1 as being used, it is to be appreciated that, at any point in time, as many slime ponds as desired may be utilized. It is preferred that each successive slime pond utilized at any point in time be at an elevation slightly below the immediately adjacent upstream slime pond so that water may flow by force of gravity from pond to pond, carrying with the water some fine particles.

As time passes, additional slime ponds are added to the system and previously used slime ponds, generally full of slime or silt with reduced clarifying capability and reduced water-receiving capacity, are removed from the system. At an appropriate point in time, when the water content of an abandoned slime pond is sufficiently reduced, by evaporation and transformation, to accommodate earth moving equipment, the residual sedimentation is harvested and subjected to existing and known secondary recovery methods at site 110, such as cyanide treatment, where micro-fine gold is recovered.

At any point in time, effluent water from the distal or downstream slime pond, illustrated as pond 108 in FIG. 1, is returned, preferably under force of gravity, to the large capacity recirculating water pond or reservoir 34, where it is reused.

Vaporization, transpiration, and leakage consume some of the water processed through system 30, in the manner described above, requiring that supplemental water from source 32 via pump 36 or from some other source be added periodically or continuously to restore or maintain pond 34 at the appropriate level. It is presently believed that such losses will require that about 10–25 percent make up water be added to the pond 34.

While flow between slime ponds and thereafter from the distal slime pond to the recirculating water reservoir pond 34 is illustrated in FIG. 1 as being under force of gravity, in other configurations, the return water can be pumped to reservoir 34 as may be required, depending upon terrain and other parameters.

Ultimately, the gold accumulated in gold house 50 is processed in a refinery 112 of known type, where the gold is refined and poured into molds. The resulting solid bricks of gold are typically deposited in kind in a bank or sold to or through a licensed broker.

The Vibration Pan Feeder

Figure 2:
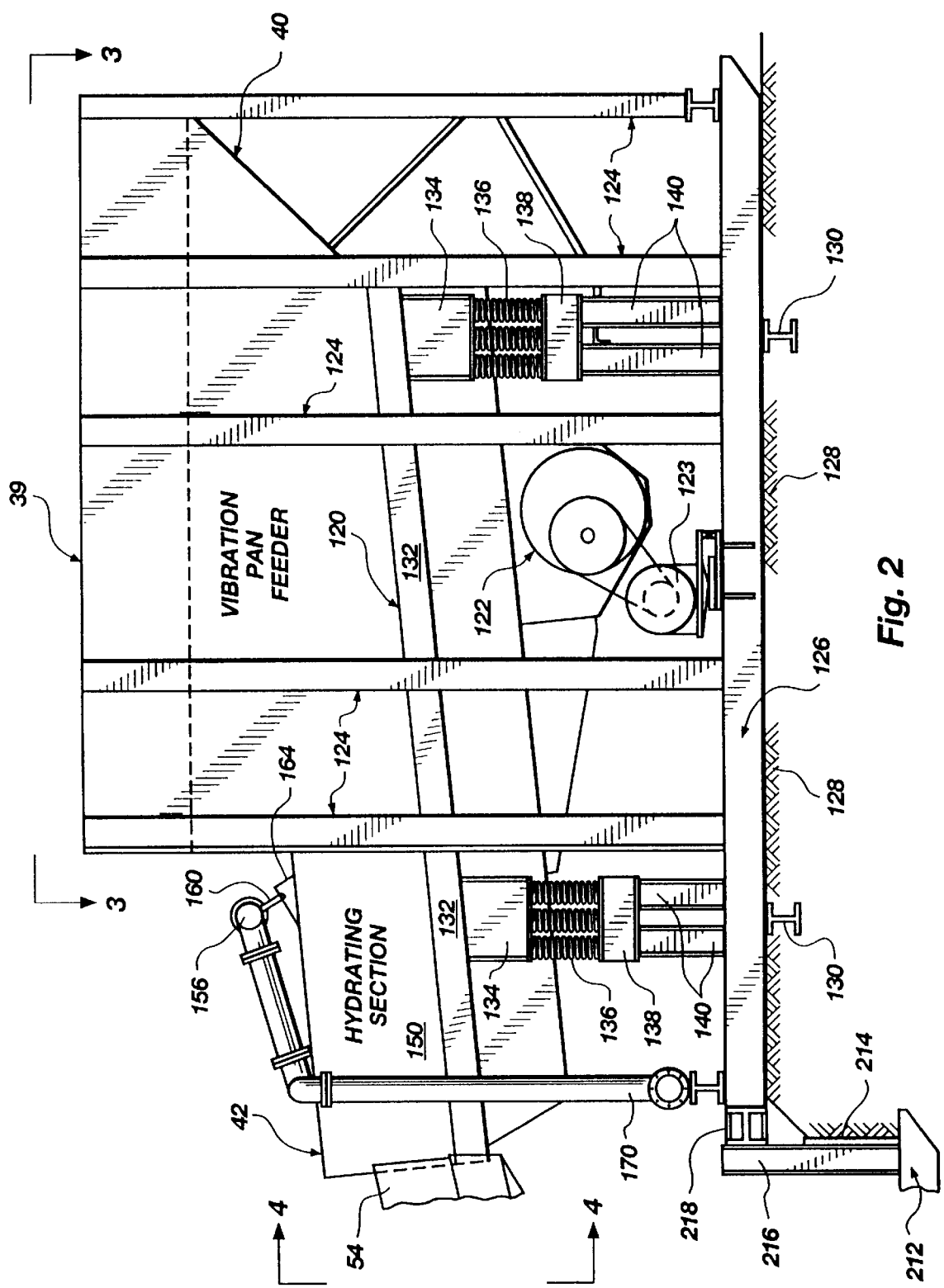
FIG. 2 is a schematic representation of the vibration pan feeder and hydrating section of the system of FIG. 1.

One suitable configuration of vibration pan feeder 40 is illustrated in FIG. 2, to which reference is now made. Vibration pan feeder 40 comprises the previously mentioned hopper or chute, generally designated 39, a vibrating plate feeder, generally designated 120, an eccentric vibrating mechanism, generally designated 122, a structural frame comprising support members, collectively generally designated 124, and a base, generally designated 126, in the form of a skid.

To the extent applicable and within the constraints imposed geographically, demographically, and financially, it is ordinarily preferred that gold recovery system 30 be formed of components which can be readily disassembled into sections or subassemblies, for portability of the system. Since such sectionalization or compartmentization is within the skill of those familiar with the art, no substantial description of the various components or sections needs to be made here.

Base or skid 126 comprises a rigid welded generally rectangular frame formed of standard structural members conventionally arranged and fastened together to withstand the expected load without failure or substantial deflection so as to prevent material settlement. As can be seen clearly from FIG. 2, skid 126 rests along its underside upon the ground, soil, or earth 128, which is preferably compacted to avoid settlement and contoured to accommodate the various parts of system 30 at different elevations. Two transversely oriented I-beams 130 are shown to be embedded in the ground, soil, or earth so that the top surface of the upper flange is essentially flush with the top surface of the earth 128 on which skid 126 rests. The vibration pan feeder 40 may thus be pulled across the ground by connecting the skid 126 to a tractor of sufficient size and horsepower to position and reposition the vibration pan feeder 40 as is appropriate.

The vibrating plate feeder 120 may be of any suitable type. One suitable vibrating plate feeder 120 which may be used is the Eliptex Heavy Duty Feeder VE-13, the size of which may be 64 inches by 24 inches, available from Hewitt-Robins located in Columbia, S.C. The Eliptex VE-13 feeder is equipped with an eccentric 122, which is driven by motor 123 to vibrate a sloped plate 132 by which ore deposited in the hopper 39 as raw influent ore is displaced to and through the hydrating section 42.

Hopper 39, as can be seen from an inspection of FIG. 3, has sloped interior sidewalls which direct the influent raw ore toward the center of the hopper 39 and onto vibration plate 132. The influent ore hopper 39 is formed of sheet steel, preferably one inch armor plate (AR) steel. Preferably, the high wear surfaces of the hopper 39 against which the ore abrades are covered by suitably secured sheets of ultra-high molecular weight polyethylene (UHMWPE).

The vibrating plate 132 is supported by four column members 134, two on each side, which are suspended upon sets of springs 136. Each spring of each set 136 rests upon a base 138 which is supported upon pairs of columns 140. Each column 140 rests upon and is supported in load transferring relationship by the skid 126.

The hopper 39 is supported on each side by a series of columns 124. The base of each column 124 rests upon the skid 126 in load-transferring relationship. The columns 124 are suitably structurally braced and cross-connected to provide the requisite stability and strength ample to support the hopper 39, each column 124 being appropriately structurally connected to the hopper 39, such as by welding, bolting, or the like, as is well understood by those skilled in the art.

It is to be understood that no hydration of ore occurs per se at or within the vibration pan feeder 40. Accordingly, the raw influent ore, deposited from any suitable earth moving equipment into hopper 39, is directed by the sloped interior sides of the hopper 39 onto the sloped vibrating plate 132. Plate 132 is oscillated by eccentric 122, causing the influent raw ore to migrate under force of gravity and the vibration along the vibration pan feeder 40, from right to left as viewed in FIG. 2, continuously into the hydrating section 42.

The Hydrating Section

One suitable hydrating section 42 is illustrated in FIGS. 2 and 4–7, to which reference is now made. The previously described vibrating plate 132 extends from vibration pan feeder 40 entirely across hydrating section 42, maintaining the desired slope for ore displacement. See FIG. 2. Opposed sidewalls 150 rest upon and are secured, such as by welding, to the vibrating plate 132 adjacent each side edge thereof. Thus, the hydrating section 42 is U-shaped in transverse cross-section, being open at both ends. The open proximal end of section 42 receives, on a continuous basis, raw ore as the raw ore slides down the vibrating plate 132 from vibration pan feeder 40 into and across hydrating section 42 and into the hydrated vibration grizzly-scalper 54. Thus, above the vibrating platform 132 and between the sidewalls 150, the hydrating section 42 is open.

It is preferred that each sidewall 150 be formed of sheet steel, preferably of AR quality. As shown in FIG. 4, each wall 150 comprises an interior sheet of steel, an exterior sheet of steel, a top sheet of steel, and vertically directed edge sheets of steel. Internal reinforcement of a conventional nature is also currently preferred. The exposed interior surface of each wall 150 is preferably lined with UHMWPE to extend the useful life of the interior sheets of steel forming sidewalls 150, since these surfaces are subjected to a high rate of abrasion by the ore as it passes through hydrating section 42. In one configuration, walls 150 may each be six feet long and four feet high and separated by 56 inches, although other configurations are within the purview of the invention.

The vibrating plate 132 comprises a rectangular opening 152 near its discharge end. Rectangular opening 152 is sized and shaped to receive a rectangular plate 154 so that the plate 154 is flush with the top surface of the vibrating plate 132. Plate 154 may be an apertured (punched) rigid sheet of one inch thick AR grade steel plate the top surface of which is covered with an attached apertured layer of UHMWPE.

The top surface of the vibrating plate 132 is likewise preferably covered with a layer of UHMWPE, secured in place in a conventional fashion, such as by use of welded threaded studs.

Superimposed near the proximal or inlet end of the hydrating section 42 is a header pipe 156, which transversely spans the entire distance between the two walls 150 and is supported upon supports 158 of steel, contiguous with and welded to the top plate of the two sidewalls 150, respectively. See FIG. 4. The header pipe 156 is closed at its terminal end 158, receives water under pressure from supply pipe 170 and comprises a plurality of downwardly and rearwardly-directed openings, each receiving or being in alignment with the proximal end of a nozzle 160. The nozzles are welded in place, for example.

The sizes of header pipe 156 and supply pipe 170 may be appropriately selected by those skilled in the art, depending on various parameters. For example, each pipe may be six inches in diameter.

The hollow interior of each nozzle 160 is in fluid communication with the interior of the header pipe 156. The outlet or distal end 166 of each nozzle is exposed below and protected by the shield 164. Each nozzle 160 is directed downwardly and backwardly (upstream) toward ore moving along the vibrating plate 132 from vibration plan feeder 40 to hydrating section 42. The shield 164 illustrated in FIGS. 2, 4, and 5 is an angle structural steel member, which is welded or otherwise secured at each end thereof to the walls 150. Shield 164 rigidifies the header 56 and forms an umbrella or sheath directly above the discharge ends 166 of the nozzles 160 to protect against damage and possible inoperability caused by large boulders intending to be dropped into hopper 39, but inadvertently misdirected so as to fall upon either the header pipe 156 or the shield 154.

Primary carrier water is delivered to header pipe 156 from supply tube 170 and flows thence through the nozzles 160 into the hydrating section 42. This partially hydrates the ore and blasts surface gold from the ore. While primary water, emitted as a vigorous pressurized spray from each of the nozzles 160 is illustrated in FIG. 1 as being delivered from recirculation water pond 34 via high capacity, high pressure pump 44, it is to be appreciated that any source of water ample in quantity and capable of being satisfactorily pressurized may be employed, using as many pumps as needed.

The nozzles 160 may be arranged, directed, and spaced as desired. For example, the nozzles 160 nearest each wall 150 may be spaced six inches from each wall 150 and, thereafter, equally spaced. The pressure and water discharge from nozzles 160 may be selected by those skilled in the art. For example, one column of water at 50 psi may be used.

Figure 7:
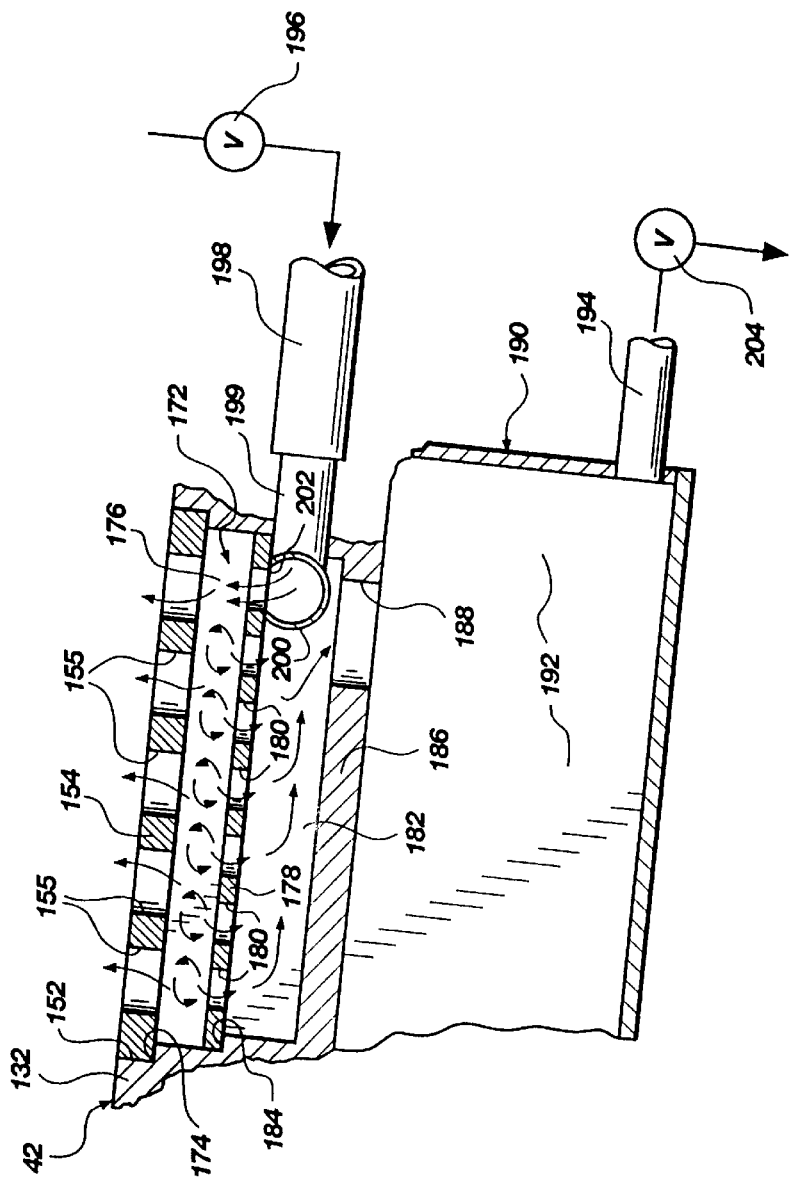
FIG. 7 is an enlarged fragmentary cross-section taken along lines 7—7 of FIG. 4.

Apertured plate 154 comprises part of a primary boil box, generally designated 172 in FIG. 7. Apertured plate 154 rests by force of gravity, in the illustrated configuration, upon a lip or shoulder 174 fashioned in the vibration plate 132, as best illustrated in FIGS. 6 and 7. Screws may be used to removably secure plate 154 in its operative position. The apertures 155 in plate 154 are illustrated as being of uniform diameter and relatively large, the size being selected to accommodate passage of the larger available nuggets from the ore through the apertures 155 to the compartment 176 immediately below the plate 154. See FIG. 7. Vibration of the plate 132 as the sprayed (hydrated) ore moves down the plate 132 causes the ore to oscillate somewhat back and forth. This causes the relatively heavy gold nuggets in the ore to begin to migrate toward the bottom of the stream of influent ore and to vibrate back and forth across the plate 154 where nuggets fall through the apertures 155 into compartment 176. The size of apertures 155 may be selected by those skilled in the art. For example, each aperture 155 may comprise a diameter of 1½ inches.

A second apertured plate 178 is disposed below and substantially parallel to top plate 154. Plate 176 may be held releasibly in position by screws. Plate 176 defines the lower limit of compartment 176. Second plate 176 comprises uniformly spaced and uniformly sized apertures 180. The size of each aperture 180 is selected so as to prevent passage of the relatively large nuggets therethrough, but accommodate passage of intermediate sized and small nuggets as well as smaller pieces of gold from chamber 176 through the apertures 180 into lower chamber 182. The size of apertures 180 may be selected by those skilled in the art. For example, each aperture 180 may comprise a diameter of ¾ inch.

Thus, the larger nuggets remain trapped in chamber 176 and are periodically removed by shutting off the flow of water and ore, removing the plate 154 and manually harvesting the large nuggets from chamber 176.

Similarly, the intermediate sized nuggets are trapped in and periodically removed from chamber 182, preferably at the same time the nuggets in compartment 176 are removed, by lifting plate 178 from the position illustrated in FIG. 7 at the point in time when plate 154 has been removed. The intermediate sized nuggets in chamber 182 are thereafter harvested. The plates 178 and 154 are manually returned to their operative positions as illustrated in FIG. 7, with plate 178 resting upon a shoulder 184. Plate 178 may be of any suitable material, for example, ¼ inch hardened screen may be used.

The bottom wall 186, defining the lower portion of boil box 172, is interrupted by a transverse slot 188 through which relatively small nuggets and smaller particles of gold, residual particles of ore, and primary (carrier) water and secondary water flow into a triangularly-shaped tank 190, formed preferably of welded steel. Triangular tank 190 comprises a hollow interior 192. Tank 190 comprises a discharge pipe 194 and a valve 204, which controls discharge flow from chamber 192 of tank 190 through discharge pipe 194.

During operation, secondary water, illustrated in FIG. 1 as being obtained from recirculation water pond 34, is placed under high pressure and displaced by pump 44. This water is delivered across valve 196 (FIG. 7) into a secondary water pipe 198 and along a rubber hose 199. Hose 199 discharges into an apertured header pipe 200. Transverse header pipe 200 emits secondary water turbulently under high pressure from a series of apertures 202 through aligned apertures 180 in plate 178 causing vigorous turbulence in chamber 176, driving some of the secondary water upwardly through apertures 155 in plate 154 and the remainder downwardly in a turbulent fashion through apertures 180 in plate 178 into bottom chamber 182 and thence through slot 188. The action of the secondary water emitted under pressure from header pipe 200 is illustrated by the flow arrows shown in FIG. 7.

While other arrangements may be used, pipe 198 may be 1½ inches in diameter and hose 199 may comprise a diameter of ¾ of one inch. Use of the rubber hose 199 better accommodates vibration of plate 132 without damage. While not critical, it is presently preferred that water from header 200 issuing upwardly through apertures 155 have a pressure on the order of 1–2 pounds over ambient pressure. Slot 188 in the illustrated configuration may comprise an opening three inches in the direction of one flow through the hydrating section 42.

After a certain interval of operation, chamber 192 will become full of water as will chamber 182. Nevertheless, the turbulence caused by secondary water discharged from header pipe 200 continues to remove all of the solid particles in chamber 176 except for the large nuggets and all of the solid particles from chamber 182 except the intermediate sized nuggets.

Periodically, for example once every 24 hours, valve 204 is opened to drain the accumulated water, small nuggets, small gold particles, and ore from chamber 192 and deliver the same via pipe 194 to trough 52 for further processing. See FIGS. 1 and 7. While those skilled in the art may make an appropriate selection, pipe 194 may have a diameter of four inches.

The Hydrated Vibration Grizzly-Scalper

One suitable ore segregator 54, identified in FIG. 1 as a hydrated vibration grizzly-scalper, comprises a two-deck grizzly-scalper available from Hewitt-Robins, Columbia, S.C. More specifically, the Hewitt-Robins heavy duty VIBREX two-deck vibrator is suitable, with the top deck comprising sets of grizzly rails capable of passing ore of one predetermined size is preferred. While not a limitation of the present invention, the grizzly rails or grizzly rods may be selected to pass ore equal to or less than four inches in size. The bottom deck comprises a planar member with apertures of a desired size which passes ore of another smaller predetermined size. For example, but not by way of limitation as to the present invention, the apertures in the lower planar member may be rectangular or square in configuration where the ore capable of passing will be on the order of three-quarter inch, although the diagonal dimension of each aperture, being one inch, will permit ore, when diagonally disposed, to pass which is slightly larger than three-quarter inch. The above-described grizzly-scalper features available in the VIBREX line from Hewitt-Robins are described in Hewitt-Robins Catalog 2106-B-5M-0784.

Figure 8:
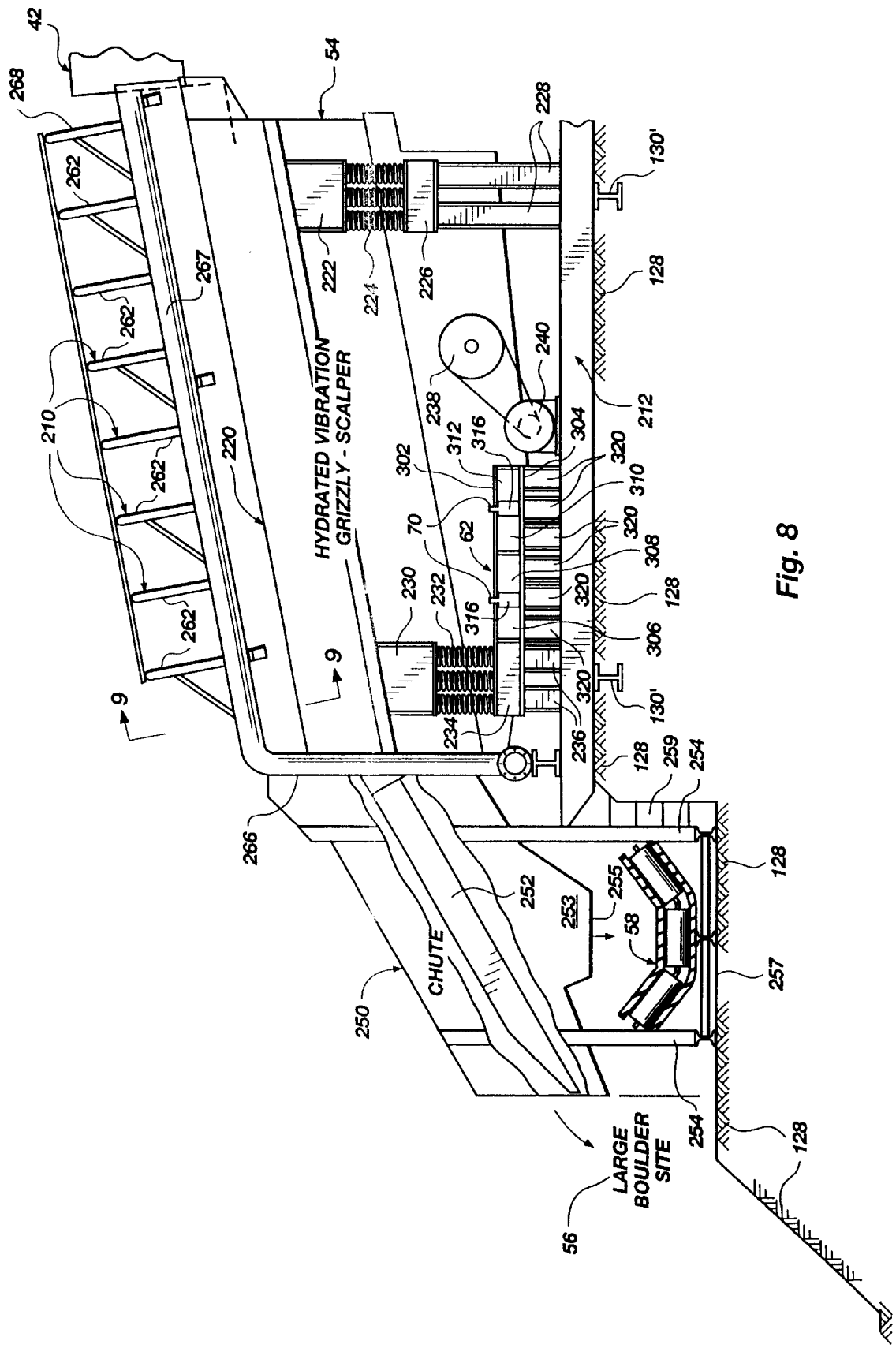
FIG. 8 is a schematic side elevational view of the hydrated vibration grizzly-scalper of the system of FIG. 1, equipped with a boulder discharge chute.
Figure 9:
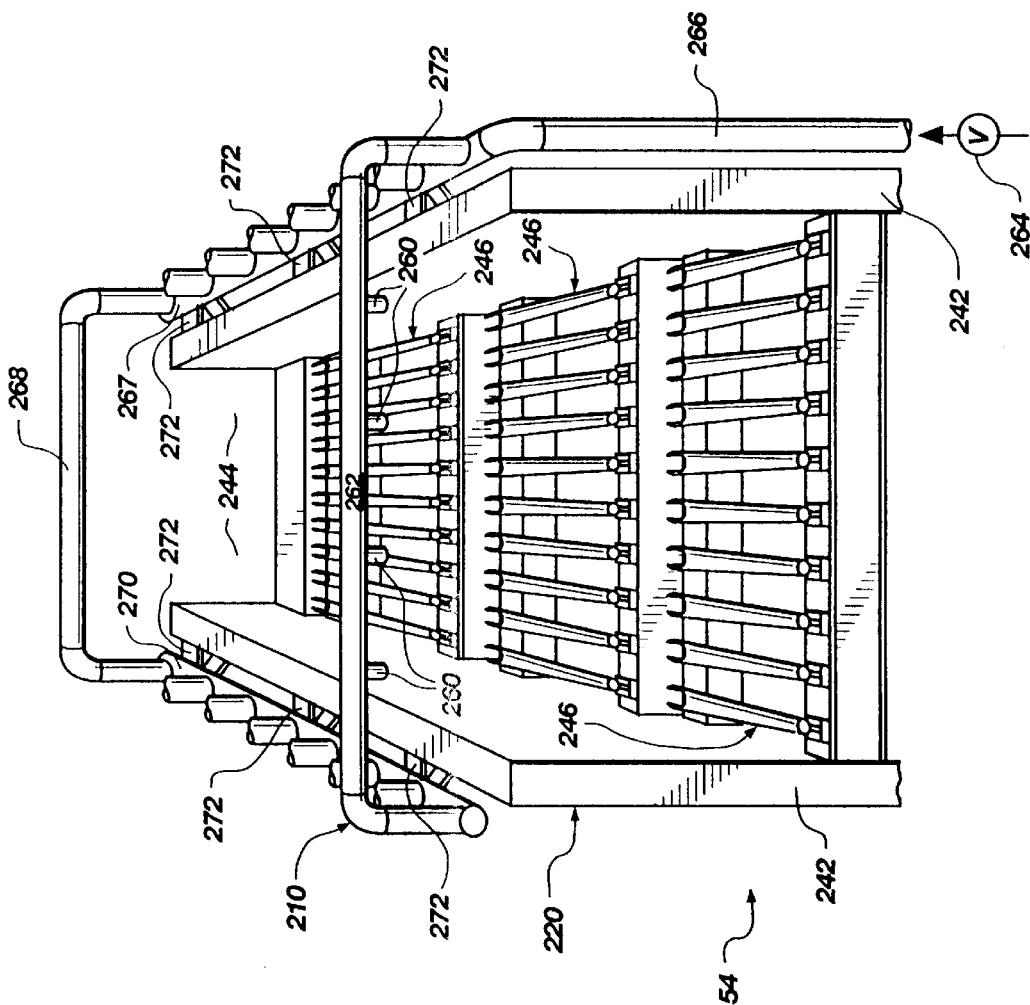
FIG. 9 is an enlarged elevational view of the top deck of the grizzly-scalper, taken along lines 9—9 of FIG. 8.
Figure 10:
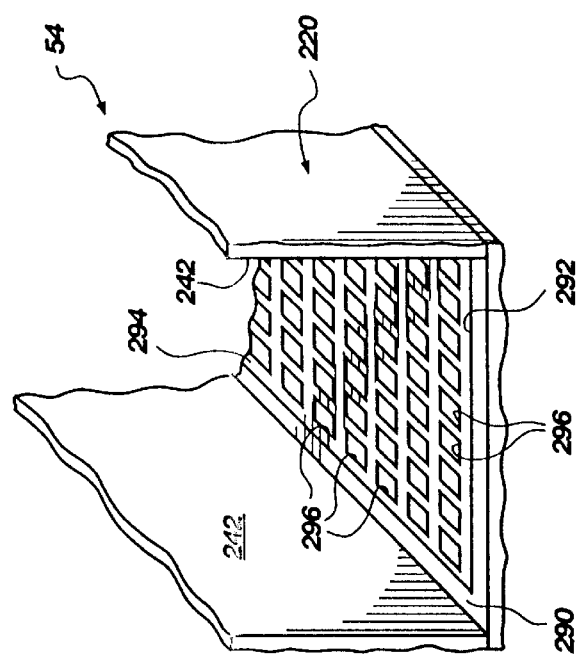
FIG. 10 is a fragmentary enlarged elevational view of the bottom deck of the grizzly-scalper, taken along lines 10—10 of FIG. 8.

As an addition to the Hewitt-Robins grizzly-scalper mentioned above, segregator 54 also comprises hydrating system 210 comprising a series of overhead water spraying headers 262, shown in FIGS. 8–10.

With specific reference to FIG. 8, it can readily be seen that the grizzly-scalper 54 is supported upon a skid 212, which may have and preferably has the characteristics previously described in conjunction with skid 126. Skid 212 is supported in a horizontal orientation upon the ground 128, being stabilized in position by two transversely oriented I-beams 130, which are buried in the ground 128 so that the top surface of the top flange of each is flush with the surface of the ground 128 and contiguous with the lower surface of the skid 212. With reference to FIG. 2, it can be seen that skid 212 is located at an elevation below the elevation at which skid 126 is horizontally located. A planar barrier 214, equal in transverse length to the transverse dimension of skid 212 prevents soil to the right and above skid 212 (as shown in FIG. 2) from sluffing off onto the skid 212. Earth barrier 214 is supported in position by a plurality of short columns 216, which are connected by an I-beam 218 to the skid 226.

The Hewitt-Robins grizzly-scalper portion of segregator 54 is generally designated 220 in FIGS. 8–10. The grizzly-scalper segment 220 and the hydrating section 210 superimposed thereon are supported at each side near the rear by column members 222 and a set of vertically oriented springs 224 in tandem, the lower ends of which rest upon a base member 226. Base member 226 is in turn supported by a pair of columns 228, contiguously interposed between base 226 and skid 212.

Similarly, front or downstream support is provided on each side of the grizzly-scalper 220 and the hydrating section 210. Specifically, on each side a column member 230 contiguously supports the grizzly-scalper 220, which in turn is supported by a plurality of vertically oriented springs 232 arranged in tandem. Springs 232 rest upon a base member 234, which in turn is supported upon two side-by-side columns 236. Columns 236 are interposed contiguously between base 234 and skid 212.

Thus, the grizzly-scalper 220 is resiliently suspended upon two sets of springs 224, one on each side, and two sets of springs 232, one set on each side. This minimizes damage as the grizzly-scalper 220 is vibrated by an eccentric 238, powered by a motor 240. As can be observed from FIG. 8, the grizzly-scalper 220 is disposed at a substantial angle to the horizontal so that vibration thereof not only segregates the ore by weight as it passes therethrough, but causes the ore to be continuously displaced through the grizzly-scalper 220 from right to left, as viewed in FIG. 8.

With reference to FIGS. 9 and 10, the grizzly-scalper 220 comprises spaced steel sidewalls 242, defining a space therebetween compatible with the space between walls 150 of the hydrating section 42. Surfaces of grizzly-scalper 220 subjected to ore abrasion are preferably covered with a layer of UHMWPE. The stream of raw ore issuing from hydrating section 42 enters an opening 244 which has a predetermined width which is compatible with the ore stream width. This stream of raw ore is displaced along successive sets of grizzly bars 246. The three sets of grizzly bars are set or spaced to accommodate passage of ore particles having a predetermined size, for example a four inch or less size. Vibration of the grizzly-scalper 220 will cause the boulders greater than a four inch size to migrate across the sets of grizzlies 246 and to enter a chute generally designated 250 which comprises sloped spaced fingers 252, arranged side-by-side. Very large boulders continue down along the top surface of the fingers 252, falling off the distal ends thereof onto the ground at site 56, for either storage or removal purposes as deemed best for the operation in question. Boulders greater than four inch and less than very large boulders fall downwardly at chute 250 through the spaces between the fingers 252 through a channel 253, which opens at bottom 255, onto conveyor 58.

Chute 250 is supported in an elevated position upon a plurality of columns 254 on each side such that the slope of fingers 254 is at a greater angle to the horizontal than is the slope of grizzly-scalper 220. This insures continuous displacement of the large boulders onto, across, and through the fingers 252 of chute 250. The columns 254 which support chute 250 are supported upon I-beams, which rest upon the ground having a horizontal surface 257, which is substantially below the elevation of skid 212. A barrier 259, which may comprise a concrete block wall, prevent the earth above surface 257 from sluffing down into the region where conveyor 58 is located.

Ore ingressing through opening 244 of and displaced through grizzly-scalper 220 is subjected to spray from header nozzles 260 extending generally downwardly and at a rearward acute angle to the vertical from each of several overhead header water supply pipes 262, only one of which is illustrated in FIG. 9, for purposes of clarity. The others are illustrated in FIG. 8. With valve 264 (FIG. 9) in an open position, water from pond 34, delivered across filter 46 and driven by pump 44 is delivered at high pressure and in large quantity to the hydrating section 210 by pipe 266. The influent water in pipe 266 is delivered to water manifold 267 on one side of the grizzly-scalper 220 and from thence through overhead pipe 268 to a second manifold pipe 270 on the other side of the grizzly-scalper 220. Manifold pipes 267 and 270 are supported in a position substantially parallel and directly adjacent the top surface of the opposed walls 242, being held in that position by a plurality of triangularly-shaped steel brackets 272, which span between and are welded to manifolds 267 and 270, respectively, and the opposed sidewalls 242 at the outside surface thereof.

The spacing between the nozzles 260 of any header 262 is illustrated as being uniform. The number of headers 262 and the number of nozzles 260 and the spacing may be selected by those skilled in the art to optimize performance depending on the nature of any given operation. Four nozzles per nozzle header are illustrated in FIG. 9. The outside nozzles are spaced a short distance, for example, six inches, from the inside surface of each wall 242.

In the configuration of FIG. 1, it is preferred that pump 44 deliver approximately 4,000 gallons per minute to hydrating unit 210 via pipe 266. Pipe 266 is preferably, therefore, typically on the order of ten–twelve inches in diameter.

Correspondingly, nozzles 260, extending from all of the header pipes 262, collectively deliver to the ore displaced along the top deck of the grizzly-scalper 220 approximately 4,000 gallons per minute of high pressure spray water. This water not only blasts gold from the surface of the ore, but substantially hydrates the ore ultimately processed so that the mix of ore and water flow substantially as a fluid. A ratio by weight of about 25% ore and 75% water processed for gold recovery is suitable for the illustrated configuration.

FIG. 10 illustrates the second or lower deck of the grizzly-scalper section 220. The lower deck, designated 290, comprises a rectangular recess 292 near the discharge end, in which a correspondingly sized rectangular plate 294 is placed. Plate 294 is preferably formed of a one inch sheet of rigid UHMWPE. The plate 294 comprises a plurality of spaced apertures, which may be arranged in aligned columns and lines as illustrated, or otherwise arranged. The configuration or shape of the openings 292 is not critical. However, the openings 296 may be rectangular or square, as illustrated. The apertures 296 are shaped, sized, and arranged to accommodate passage of ore particles having a predetermined size to optimize hydration and fluid displacement thereof with the above-described carrier water and to optimize gold recovery in the manner explained below. In the illustrated configuration, the apertures 296 are illustrated as being square and may be dimensioned so as to be three quarters of one inch in each direction and, therefore, one inch in diagonal dimension.

As the hydrated ore particles of a first larger predetermined size, such as four inches and less, pass between the vibrating sets of grizzly bars 246 (FIG. 9), these ore particles land, together with the hydrating carrier water, upon the upper surface of lower deck 290 and move downwardly due to the vibration of the grizzly-scalper 220 by eccentric 238 and the slope of lower deck 290, which is either the same or substantially the same as the slope at the top deck of the grizzly-scalper 220. The vibration of grizzly-scalper 220 shifts the ore transversely back and forth somewhat as it slides down the lower deck 290 so that particles equal to and less than the size of apertures 296 fall into splitter 62 (FIG. 1) through the apertures 296 of plate 294 together with substantially all of the hydrating carrier water. The remaining ore particles within a size range equal to and less than those permitted to pass through or between the grizzly rods 246, but too large to pass through apertures 296 are discharged from the downstream end of the lower deck 290 onto conveyor 64 and from thence to waste pile 60. See FIG. 1.

Thus, the ore particles delivered to the grizzly-scalper 220 are not only hydrated by copious amounts of water issuing from hydrating section 210 to remove surface gold and to fluidize the ore, but the ore itself is separated into four groups comprising pieces of four predetermined sizes, i.e., (1) the very large boulders, which are issued to site 56, (2) boulders or large pieces of ore less in size than the large boulders, but greater in size than those pieces of a predetermined size capable of passing between chute fingers 252 to conveyor 58, (3) those pieces of ore which can pass through the grizzly rods 246, but not through the apertures 296 which are delivered to conveyor 64, and (4) the ore pieces or particles, together with substantially all of the carrier water, which pass through apertures 296 as influent to the splitter 62.

In the preferred configuration of FIG. 1, the size of ore particles passed through the lower deck 290 to the splitter 62 will be no greater than on the order of three-quarters of one inch and smaller. Substantially all of the 4,000 gallons per minute of water delivered from headers 262 will likewise pass through the lower deck 290 to the splitter 62. Thus, the ore and water displaced from the grizzly-scalper unit 54 to the splitter 62 comprises the gold-bearing ore of a lesser predetermined size range segregated from the raw influent ore and substantially all of the hydrating water delivered by pump 44 to the hydrated vibration grizzly-scalper 54.

The Splitter

Figure 11:
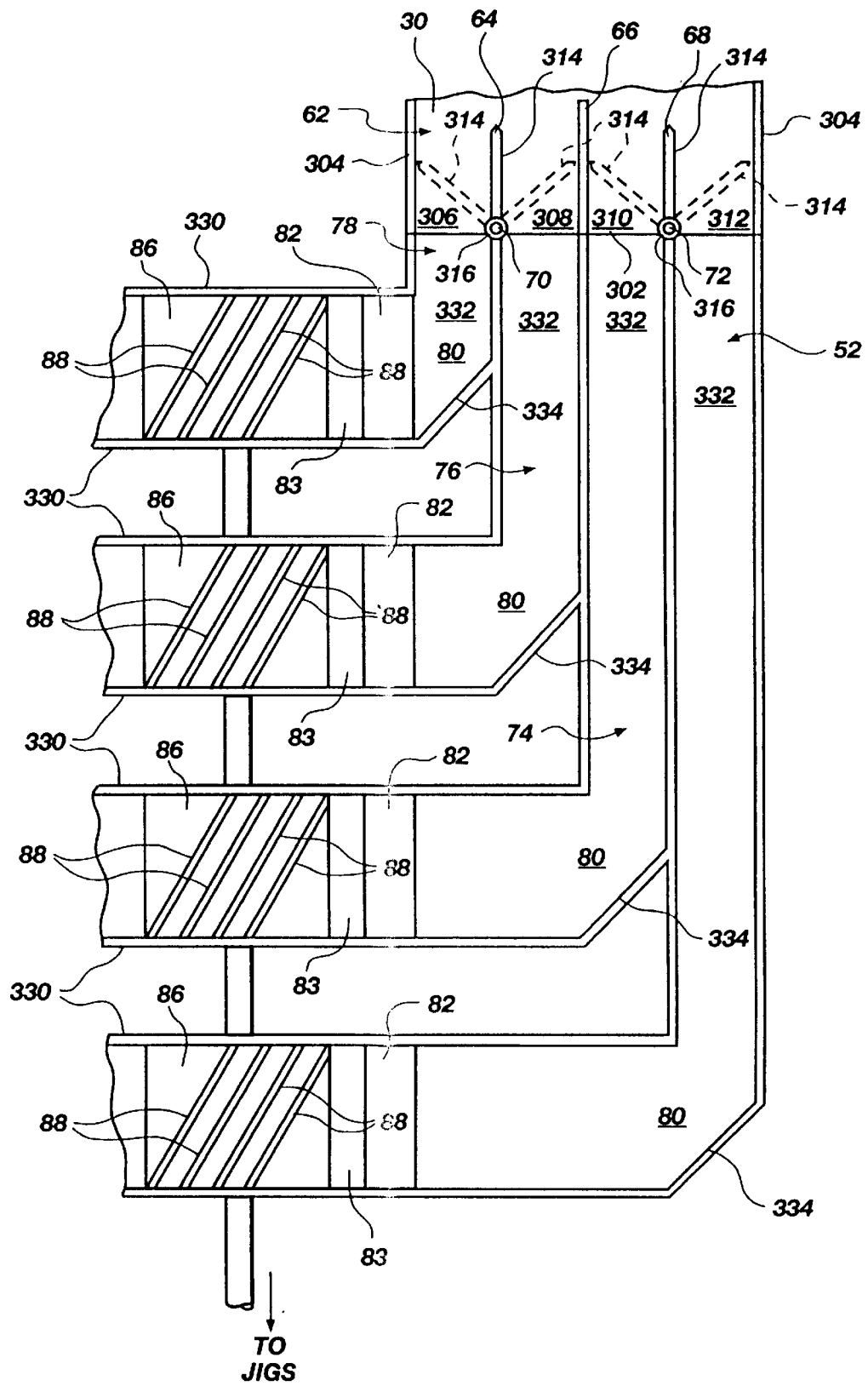
FIG. 11 is a diagrammatic plan view of the flow divider or splitter mechanism at the discharge end of the grizzly-scalper of FIG. 1, showing subdivision of the main stream from the grizzly-scalper into four smaller streams or substreams, the streams being illustrated as being turned to the left through 90° in FIG. 11 as opposed to the right, as shown in FIG. 1.

One suitable splitter or flow divider is illustrated at 62 in FIGS. 1, 8, and 11. The previously described effluent-to-be processed issuing from the hydrated vibration grizzly-scalper 54, which passes through apertures 296 in lower deck plate 294, collectively enters splitter 62. Splitter 62 comprises an influent end 300 and an effluent end 302. The intermediate portion of the splitter 62 comprises an exterior wall 304, which circumferentially spans the full 360° around the splitter 62 and is impervious to the ore-water mixture displaced through the splitter 62.

In the fully open position as shown in solid lines in FIG. 11, splitter 62 divides the single influent stream of ore-water mixture into four streams or substreams of ore-water mix, respectively discharged from the splitter 62 at the effluent end 302 through discharge channels 306, 308, 310, and 312, respectively. Channels 306, 308, 310, and 312 are defined by three interior dividers 64, 66, and 68 in conjunction with circumferential wall 304. As can be seen from observation of FIG. 11, the barrier 64, 66, and 68 are successively and equally spaced to provide, dimensionally, effluent chambers of substantially the same size.

Barriers 64 and 68 comprise rotatable gates wherein a gate blade 314, in each case, is integrally joined to a pivot arm or pin 72, journaled in a bushing 316. The pivot pin or arm 72 of each gate blade 314 extends imperviously from the interior of the splitter 62, is exposed at the exterior of the splitter 62 (see FIG. 8), and is manually grasped to selectively rotate either blade 314 to either of the two dotted positions illustrated in FIG. 11. Barrier or divider 66 is fixed in its position as illustrated in FIG. 11, being welded or otherwise suitably secured to wall 304. While either effluent channel 306 or 308 may be closed at any point in time and either channel 310 or 312 closed at any particular time, by the above-described manual rotation of blades 314, ordinarily, only one flow channel 306, 308, 310, or 312 will be closed at any one point in time to terminate flow to any desired trough 52, 74, 76, and 78. Closing, as described, of any given trough will ordinarily be for recovery of gold collected at various recovery sites along the closed trough or, alternatively, to accommodate repairs.

As seen in FIG. 8, the effluent channels 306, 308, 310, and 312 may be supported in aligned relationship upon a series of short columns 320, to provide support and stability. The columns 320 are contiguously interposed between the lower portion of wall 304 and the top of skid 212, in load transferring relation.

The interior surfaces of the splitter 62, which are subject to abrasive wear by the ore displaced therethrough, will preferably be coated or lined with a layer of UHMWPE to increase the useful life thereof. This includes not only the interior surface of wall 304, but the exposed surfaces of the stationary barrier wall 66 and the hinge splitter gates 64 and 68. This increase of useful life can be very significant considering that preferably the discharge from each channel 306, 308, 310, and 312 will comprise 1,000 gallons per minute of water together with the segregated ore discharged from the grizzly-scalper 54 for processing.

The Substream Troughs

Suitable configurations for the substream troughs are illustrated in FIGS. 1 and 11–21, the substream troughs being designated, respectively, as troughs 52, 74, 76, and 78. While the troughs are depicted as line drawings in FIG. 1 and as comprising single walls of uniform thickness between troughs in FIG. 11, in many, if not most, installations each trough will be self-contained and divided into longitudinal sections of reasonable length for ease of assembly and disassembly.

For example, one way of sectionalizing any of the troughs is illustrated in FIG. 23. A first trough section, generally designated 313, of any desired length, is connected in butt (end-to-end) relationship with another trough section generally designated 315. Trough section 313 comprises a blunt trailing edge 317, which is vertically directed, while section 315 comprises a vertically directed blunt edge 319. Edge 319 is interrupted by a male tab 321, which may be a one-quarter inch by one inch steel strap welded to edge 319 of section 315.

Correspondingly, edge 317 of trough section 313 is interrupted by a female recess 323, which may be formed of a U-shaped piece of steel welded to section 313 as illustrated in FIG. 22. The location, size, and shape of male tab 321 and female opening 323 are such that the two fit snugly together to provide the desired alignment between the trough section 313 and 315. Welded to the top surface of each of two opposed sidewalls 330 of section 313 is an angular deflector plate 325, welded to the top edge of section 313 at each trough vertical wall 330. The upwardly-directed leg of deflector plate 325 serves to assist in aligning sections 313 and 315 as the two are assembled together so that tab 321 is caused to be suitably introduced into recess 323.

Self-contained or independently constructed troughs are illustrated in FIG. 16, which also shows the substantial slope in respect to the horizontal in which the troughs are positioned prior to and during use. The troughs may rest upon the ground or be structurally supported above the ground. The troughs illustrated in FIG. 16 have the dynamic segregation boxes and other interior structure removed for clarity.

Furthermore, to illustrate adaptability and diversification, the troughs 52, 74, 76, and 78 are illustrated in FIG. 1 as turning through 90° to the right, whereas these troughs are illustrated in FIG. 11 as turning through 90° to the left. Independent of the direction through which each trough turns, the essential structural makeup and purposes of each trough remain the same. Again, to demonstrate diversity, part of the troughs in FIGS. 1 and 11 are illustrated as being contiguous troughs up to the rotation through 90° and as being spaced one from the other thereafter. To the contrary, the self-contained troughs illustrated in FIG. 16 are illustrated as being contiguously side-by-side after traversing the 90° turn.

The sized ore displaced by carrier water turbulently from each channel 306, 308, 310, and 312 of the splitter 62 abrasively enters and abrasively flows through each trough. Accordingly, the interior of the troughs are high wear area and typically are lined or coated with a layer of UHMWPE, to extend the useful life of each trough and the components disposed within each trough. It is readily apparent from the schematic of FIG. 11 that each trough comprises opposed sidewalls 330, each having a depth substantially greater than the depth of flow of the stream or substream of ore-carrier water mixture displaced therethrough.

Each trough 52, 74, 76, and 78 comprises an influent region 332 disposed in alignment with each splitter channels 306, 308, 310, and 312, as best illustrated in FIG. 11. The length of each influent segment 332 varies, because of the aligned nature of the troughs and because each turns through 90° at corner 80. Each corner 80 is comprised of a deflector plate 334, illustrated as extending vertically and being disposed at approximately 45° to the influent channel 332 of each trough. Each deflector plate turns the substream being displaced through the associated trough through essentially 90°. As mentioned earlier, in the illustrated configuration, the substream through each trough is very substantial, for example, 1,000 gallons of water plus sized ore per minute per trough. After turning through the 90° at deflector plate 334, each substream seriatim passes through boil box 82, over velocity plate or ramp 83, through slotted recovery section 86, along dynamic segregation box 84, and down spillway 95 into sloped sump 96, in a manner which will be explained hereinafter in greater detail.

While other dimensions may be selected, each trough 52, 74, 76, and 78 may be four feet wide and about one and one-half feet deep, except for the trough boil box 82, as explained below.

The Trough Boil Box

Figure 12:
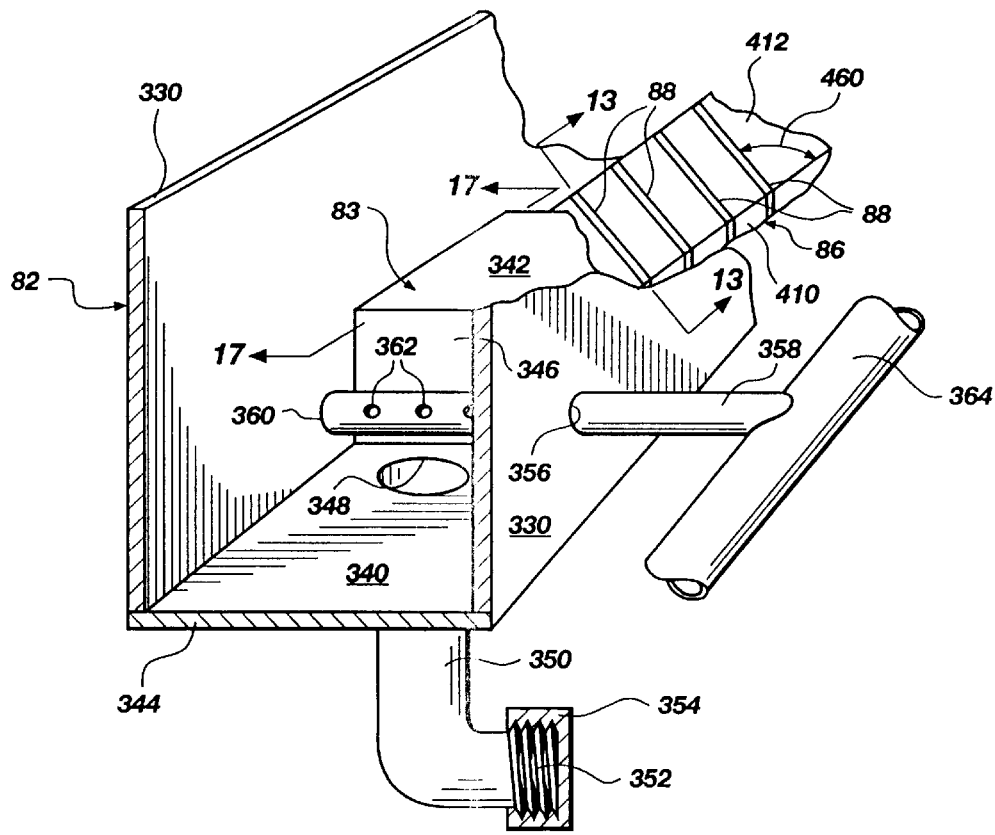
FIG. 12 is an enlarged fragmentary perspective of one of the boil boxes located near the influent to each trough-carried substream and of an adjacent slotted section, with parts broken away and removed for clarity.

One suitable trough boil box is illustrated in FIGS. 11 and 12, being there generally designated 82. One boil box 82 is interposed between the influent trough channel 332 and the ramp 83 of each trough where the bottom surface 340 of the boil box is disposed substantially below the bottom location of the immediately adjacent influent section 332 and the exposed surface 342 of the adjacent ramp 83. The fact that the boil box 82 has a depth substantially greater than the depth of adjacent influent and effluent structure in the trough provides a trap for the relatively heavy gold particles displaced as part of the substream flowing through the trough suspended within the carrier water. While the exact depth may be selected by those skilled in the art, a depth, for example, of twelve inches lower than adjacent bottom-defining structure will likely be suitable in most configurations. The trough boil box 82 in the illustrated configuration, may have a longitudinal dimension of about eighteen inches.

Boil box 82 is disposed between and partially defined by two trough sidewalls 330, the adjacent influent channel 332, a bottom wall 344 comprising top surface 340 and a rear wall 346. All walls are preferably of steel, welded together and lined at the interior thereof with a layer of UHMWPE to absorb abrasive wear caused by ore being displaced by the carrier water through the trough.

Bottom wall 344 is interrupted by an aperture 348, located very near wall 344 mid-way between walls 330, which is in alignment with gold particle collection pipe 350, the top end of which is welded to bottom wall 344. Gold collector pipe 350 is illustrated in FIG. 12 as being L-shaped and as comprising a threaded lower end 352 which is closed by a threaded removable cap 354. While the gold collection tube 350 is illustrated as being threaded at 352 and capped at 354, other forms of removable closures could be used. Periodically, gold collected in tube 350 is manually removed and delivered to gold house 50 when the trough associated therewith is taken out of service, using one of the hinged gates 64 and 68, as explained above.

As seen in FIG. 12, the right trough wall 330 is interrupted by an aperture 356, through which a header pipe 358 extends. Header pipe 358 is closed at end 360 and comprises a plurality of nozzle apertures 362 directed generally counter to the substream flow through the associated trough and boil box 82. The nozzle apertures 362 are illustrated as being uniformly spaced across the transverse dimension of boil box 82, with each outside nozzle aperture 362 being spaced a reasonable distance, for example six inches, from the adjacent interior surface of each wall 330. The size of nozzle apertures 362 may be selected by those of skill in the art, one-half inch in diameter being typically suitable where four nozzle apertures 362 are used.

Secondary water supplied, for example, from recirculation of water pond 34 (FIG. 1) displaced across one or more pumps 84 is delivered via supply pipe 364 and from thence to each header pipe 358 for delivery to each boil box 82. This secondary water is issued through nozzle apertures 362 sufficient to turbulate vigorously the ore moving through boil box 82, by which gold particles are caused to be separated from the remainder of the ore and to precipitate to the bottom of the boil box 82 coming to rest in the gold collection tube 350, which may be of any suitable diameter. For example four inches is typically suitable. While those skilled in the art may select any suitable size for supply tube 364 and header tubes 358, in the configuration illustrated in the Figures, a four inch diameter supply tube and three inch header tubes are suitable. While the rate of secondary water delivered by each header pipe 358 to each boil box 82 may be varied, typically 100 gallons per header per minute at 25 pounds per square inch is typically satisfactory.

The Velocity Plate

In the configuration illustrated and described in this specification, a velocity plate section or ramp 83 is positioned immediately downstream from each trough boil box 82. FIG. 17 illustrates a suitable velocity plate section. Velocity plate section 83, in reference to FIG. 17, is wedge-shaped in its configuration and constitutes an upwardly inclined ramp across which all of the ore-carrier water mixture discharged from the associated boil box 82 flows. The velocity plate 83 has a width substantially equal to the width between the interior surfaces of the two walls 330. See FIG. 12. The weight of each ramp 83 holds the ramp 83 in the position illustrated in FIG. 12 between the associated upstream boil box 82 and the associated downstream slotted section 86. Bondo automotive body putty may be used also to hold the velocity plate section 83 in position or to hold any other unattached component in the desired location.

While various other ramp or velocity plate configurations can be used, the one illustrated in FIG. 17 comprises a bottom planar plate 380 formed of sheet steel, preferably AR grade, disposed generally horizontally. Plates 380 may have a longitudinal dimension (in the direction of flow of two feet, although other distances could be used). Velocity plate section 83 also comprises a top planar plate 382, also preferably formed of AR grade sheet steel, disposed at an acute angle 384 to the horizontal. Consequently, the proximal ends 386 and 388 of plates 380 and 382 contiguously converge and are preferably welded together at that location. While any number of angles can be selected, an angle on the order of 10° may be suitable.

The velocity plate or ramp 83 is illustrated as comprising a vertically oriented end plate 390, contiguously interposed between the distal ends 392 and 394 of plates 380 and 382, respectively. Plate 390 is preferably welded in the position illustrated in FIG. 17.

An intermediate plate 396 is interposed centrally between the two plates 380 and 382, being sized so as to preserve the planar nature of plate 382. For purposes of being generally illuminating, a layer 398 of UHMWPE is superimposed upon and attached to the plate 382. Exposed surface 342 comprises the top surface of wear resistant UHMWPE layer 398.

The primary purpose of velocity plate section 83 is to lift the ore-water mixture crossing the velocity plate to an elevation sufficient to best accommodate the desired downstream flow through slotted section 86 and dynamic segregation box 98, located immediately downstream from the slotted section 86.

The Slotted Section

While various slotted section configurations could be selected, slotted section 86, as illustrated, is suitable for gold recovery in at least some if not most configurations of the present invention. Each trough 52, 74, 76, and 78 comprises a slotted section 86 disposed between the velocity plate section 83 and the dynamic segregation box 94. To better understand the specific construction of each slotted section 86, reference is now made to FIGS. 12–15 and 17A. Since all slotted sections 86 are the same, as illustrated, only one slotted section 86 will be described.

Figure 17A:
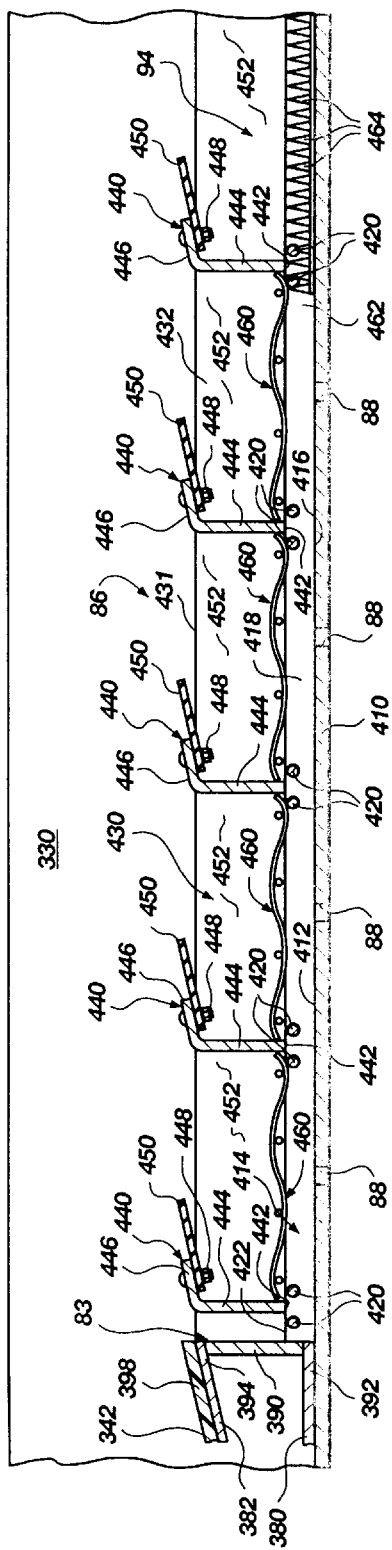
FIG. 17A is a cross-sectional view longitudinally along one slotted section of one trough.

As illustrated in FIG. 17A, each trough at its slotted section 86 comprises a bottom trough layer or wall 410, preferably of steel, for example AR grade, in which four parallel diagonally disposed slots 88 are formed. While parallel slots are preferred and while a diagonal orientation is also preferred, other slot arrangements are within the scope of the present invention. The slots 88 illustrated in FIG. 1 are diagonally oriented so that the lower portion thereof away from the associated corner 80, while the slots 88 illustrated in FIG. 12 are oppositely diagonally oriented. The slots 88 accept or receive gold particles which are at or near the bottom surface 412. Thus, each slotted section 86 comprises a second gold recovery site sequentially disposed along each trough.

A lower independent frame, generally designated 414, is placed in each trough so that the lower surface 416 rests upon top surface 412. The frame 414 is not attached to the associated trough. The lower frame 414 comprises two rectangular side bars 418, which run parallel to the trough and have an out-to-out dimension transverse of the trough only slightly less than the width of the trough between the interior surfaces of walls 330. Enough play or space is provided to allow manual insertion and removal of frame 414. It is preferred that the lower frame 414 comprises a plurality of sections arranged successively in end-to-end butt relationship, to accommodate ease of insertion and removal by hand. The side bars 418 are connected together by pairs of transverse rods 420. The zenith of top surface of each rod 420 lies generally in the same plane as that which contains the top surface 422 of the side bars 418. While other sizes could be used, bars 418 may be one-quarter inch thick and one inch in height. The rod may be one-half inch in diameter.

A top or upper frame, generally designated 430, is superimposed upon top surface 422 but unattached to the bottom frame 414 and unattached to the trough. Frame 430 is retained in the position illustrated in FIG. 17A by its weight, the respective widths of frames 414 and 430 being substantially the same.

Preferably frames 414 and 430 are formed of steel, such as AR quality steel. The upper frame 430 comprises opposed side bars 432, which are rectangular in cross-section. While other dimensions may be used, side bars 432 may be one-quarter inch thick and two inches in height. The two bars 432 comprise top surface 431, a bottom surface 433, and are spaced from each other on an out-to-out basis so as to be slightly smaller in transverse dimension than the distance between the interior surfaces of opposed trough sidewalls 330, to allow ease of manual insertion and removal. Preferably top frame 430 is sectionalized into relatively short manually manipulable segments or sections which are arranged end-to-end to form the completed frame 430 in each trough.

Upper frame 430 comprises transverse barriers, each generally designated 440, which extend transverse of the trough between the opposed side bars 432 and are secured thereto, for example, by welding. Preferably, each barrier 440 are formed of high quality steel, such as AR grade. All exposed surfaces subject to ore abrasion forming part of slotted section 86 are preferably covered with UHMWPE, to extend useful life.

The bottom edge 442 of each barrier 440 is at an elevation illustrated as being parallel to the top surface 422 of the two side bars 418. Each barrier 440 is illustrated as comprising a structural angle having a first leg 444, disposed in a vertical direction, and a second leg 446, illustrated as being disposed at an angle to both the horizontal and the vertical. Leg 444 has a vertical dimension illustrated as being generally equal to the height of bars 432. Each leg 446 is periodically apertured in a transverse direction and a bolt assembly 448 placed through each aperture by which a yieldable fin, paddle, or flap 450 is secured to the underside of the leg 446, in contiguous relation. Each flap 450 extends transversely essentially across the entire trough and is cantilevered from its connection to angle leg 446 in an upward and downstream direction. Each flap 450 may be slit at 451 at various locations, as desired.

As explained herein in greater detail, the flow of turbulent carrier water-ore mixture through each slotted section 86 causes the flaps 450 to flex up and down at the free end. This causes turbulent ore-water mix introduced into each compartment 452 between each two consecutive barriers 440 to vigorously revolve upon itself, enhancing separation and sedimentation of gold particles.

As best illustrated in FIG. 17A, a rectangular piece of a porous screen or wire, generally designated 460, is manually inserted so as to rest by force of gravity upon the fore and aft transverse rods 420 exposed in each compartment 452. While other forms of apertured material could be used, wedge wire stainless steel screen having apertures between the longitudinal and transverse wire portions comprising a size on the order of three-quarters of one inch will be suitable. The revolving turbulent ore-water flow within each compartment 452 of each slotted section 86 will cause the gold particles to precipitate through the apertures in the screen segments 460 into that portion of the trough located below the pairs of rods 420. The flow below the screen sections 460 is laminar in the slotted sections 86, which means that the particles of gold below each screen segment 460 will move slowly with the current along the bottom surface 412 and will fall and/or be drawn into the diagonal slots 88. While other configurations could be used, four diagonally disposed slots 88, each having a one-half inch width and extending diagonally essentially entirely across the width of the trough will be suitable in most configurations. While other angles could be used, an acute angle 462 (FIG. 12) of about 60° is suitable for most configurations.

Gold particles having a size of about three-quarters of one inch will pass through one of the screen segments 460, but the larger ones are too large to pass into one of the slots 88. These accumulate in region 462 (FIG. 17A), where upwardly directed yieldable blades 464 commence. Blades 464 will be explained in greater detail hereinafter. The gold particles at the bottom of section 86 having a size from slightly less than one-half of one inch and smaller pass through the slots 88.

Figure 13:
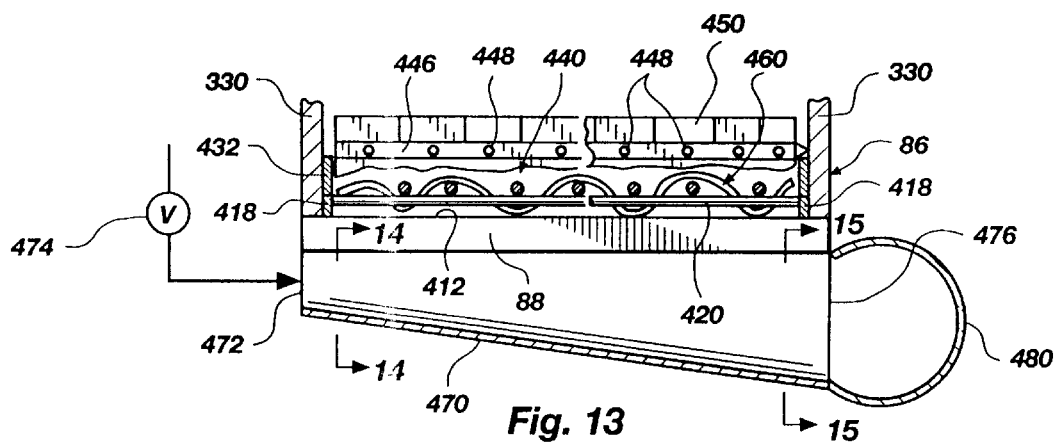
FIG. 13 is an enlarged fragmentary cross-section taken along lines 13—13 of FIG. 12.
Figures 14, 15:
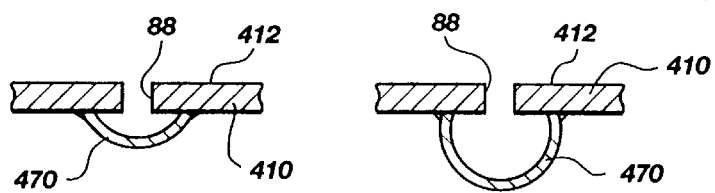
FIG. 14 is an enlarged fragmentary cross-section taken along lines 14—14 of FIG. 13.
FIG. 15 is an enlarged fragmentary cross-section taken along lines 15—15 of FIG. 13.

Reference is now made to FIGS. 13–15, which illustrate a manner in which secondary water is used to draw gold particles downwardly through each slot 88, to enhance gold recovery. Each diagonally disposed slot 88, as best illustrated in FIG. 13, empties into an asymmetric conduit 470 disposed below and in aligned relation with the associated slot 88. Conduit 470 has a relatively small inlet at 472 into which secondary water, illustrated in FIG. 1 as being delivered from pond 34 across a pump 84, is introduced under pressure across valve 474, valve 474 being in the open position. The cross-sectional area of the asymmetrical tube 470 increases in the direction of flow through tube 470 so that the cross-sectional area at the exit site 476 has the largest cross-section and is substantially larger in cross-section than at the entry site 472. Thus, as flow in each tube 470 occurs from left to right, as illustrated in FIG. 13, it expands and slows.

The flow of secondary water through each asymmetrical tube 470 draws some carrier water and gold particles downwardly through the associated slot 88 into the tube 470. Note that slot 88 is centrally disposed above the tube 470 through its entire length. Secondary water, some carrier water, and gold particles exiting discharge site 476 of tube 470 are collectively displaced along a tube 480 by pump 90 to at least one and normally a series of successively disposed mineral jigs 92 (FIG. 1).

Each mineral jig 92 (FIG. 1) is preferably a commercially available mineral jig. For example, Rahco mineral jigs, available from R. A. Hanson Company, Inc. of Spokane, Wash., may be used to recover gold particles from the mixture flowing through each tube 480. The gold recovered at mineral jigs 92 is physically delivered to gold house 50. Typically, a Rahco 42 inch by 42 inch duplex vibrating 10 mesh jig is suitable for each slotted section 86. Such jigs are cleaned out every one to two days.

The diameter of pipe 470 at the effluent end 476 is normally smaller in diameter than the diameter of tube 480. While not by way of limitation, end 476 may have a diameter of three inches, for example, while tube 480 is comprised of a diameter of four inches, for example.

While variations in the longitudinal length of slotted section 86, i.e., in the direction of flow, may vary, an eight foot longitudinal length in which the four slots 88 are disposed in a uniformly spaced fashion will be satisfactory in most configurations.

The top edge 431 of each bar 432 is preferably substantially aligned with the upper downstream end of layer 398 of ramp or velocity plate 83.

The Dynamic Segregation Box

While other configurations, within the scope of the present invention, could be utilized, the dynamic segregation box or segment illustrated in the Figures, used in each trough 52, 74, 76, and 78, is suitable in many if not most configurations of the invention. In reference to FIG. 16, in the illustrated configuration, one dynamic segregation box 94 will be positioned in the central segment of each trough, i.e., in the portion of the troughs 52, 74, 76, and 78 . Thus, as illustrated, the slope of each trough is steeper along the dynamic segregation box than in the portion of each trough upstream from the segregation box. While other arrangements could be used, a slope within the range of two inches to three inches per longitudinal foot of trough is typically satisfactory through each dynamic segregation box.

Fundamental similarities exist between each slotted section 86 and each dynamic segregation box 94. These differences include: (1) an absence of slots or other openings in the bottom member or floor 410 of the trough through each dynamic segregation box 94 (except at the discharge end), (2) an absence of the screen sections 460 in each dynamic segregation box 94, and (3) the presence of upwardly directed yieldable blades 464 in the dynamic segregation box, which blades are not present along the interior surface 410 of the bottom wall 410 in the slotted section 86.

Yieldable upwardly-directed blades 464 may comprise the blades of outdoor carpet formed of synthetic resinous material, such as product CH10 available from Monsanto Chemical. The blades 464 have a height on the order of the depth of side bars 418. The weight of the carpet and engagement of the blades 464 with the cross rods 420 removably hold the carpet in its installed position.

While any length may be selected for each trough segment in which one dynamic segregation box 94 is placed, a suitable length may comprise four ten-foot successive sections of the trough in which forty feet of dynamic segregation components are placed. These dynamic segregation components may also be sectionalized in any length accommodating manual manipulation. For example, the components may be in two foot sections placed end to end. While other arrangements can be used, in the illustrated configuration, it is preferred that each bar 418 have a depth of one inch, each bar 432 have a depth of four inches. The spacing between each pair of rods may be set at one and one-half inches and the spacings between vertical barrier legs 444 between successive barriers 440 may be set at eight inches. Each flap 450 may have a dimension in the direction of flow of about two and three-quarters inches and that the distance between the distal downstream edge of each flap 450 to the next consecutive vertical leg 444 of barrier 440 may be approximately five inches. In the illustrated configuration, each flap 450 may be slit at successive slits 451 where the spacing between slits is approximately six inches and the slits of successive flaps may be offset by three inches, as best shown at the top of exploded perspective seen in FIG. 18.

The flow of carrier water and ore through each dynamic segregation box 94 is subdivided into three layers, i.e., a bottom layer generally or substantially between side bars 418, which is laminar, an intermediate revolving and turbulent compartmentized layer within each compartment 452, substantially confined between adjacent upright barrier legs 444 and between side bars 432, and a top unobstructed turbulent layer above the side bars 432 to the top or water line of the substream flowing through the trough.

The intermediate flow layer is not continuous along the trough through the dynamic segregation box 94, but is formed primarily from carrier water and ore initially disposed in the top flow layer. The compartments 452 in which the middle layer flow occurs comprise middle flow layer impervious barriers 440 disposed transversely of the trough and located successively along the dynamic segregation box 94. As mentioned before, structural angles are preferred for barriers 440 and, while other configurations can be used, in the illustrated configuration the included angle between barrier legs 444 and 446 may be on the order of 112°. In the illustrated embodiment, that the top flow layer may be on the order of four inches deep.

Each barrier 440 does not accommodate middle layer flow from compartment-to-compartment. Middle layer flow in one compartment must move up and down into the top and bottom flow layers, respectively, to traverse from one compartment to the next consecutive compartment.

Figure 21:
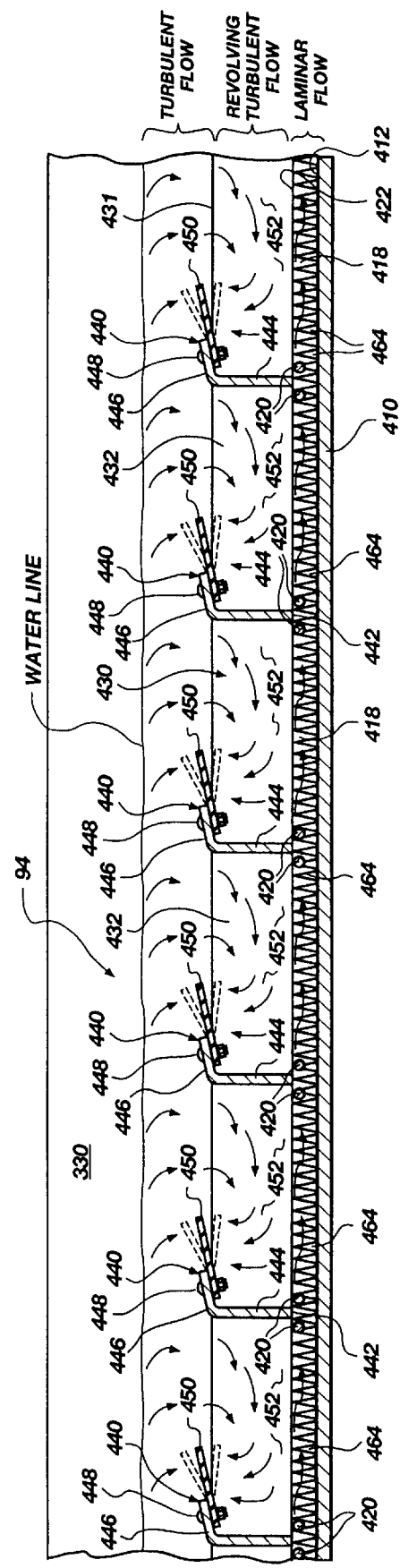
FIG. 21 is a schematic of the nature of the flow of carrier water containing ore through a dynamic segregation box.

Within each compartment 452, between successive barriers 440, the middle flow layer is revolving and highly turbulent as depicted by the arrows contained within each compartment 52 in FIG. 21. This flow is enhanced by oscillation of the fins, paddles, or yieldable flaps or flippers 450, which may be formed of any suitable resilient yieldable elastomeric material, reinforced conveyor belt material being suitable. The flaps 450 are caused to vigorously move up and down as illustrated in dotted lines in FIG. 21 responsive to the dynamics of flow in the top layer and the adjacent middle layer of flow.

The oscillating or whipping motion of each transversely disposed, longitudinally extending cantilevered flap 450 enhances separation of gold particles from the remainder of the ore and sedimentation of the gold particles from the middle flow layer into the bottom flow layer. Because of the nature of the flow through each dynamic segregation box and particularly within each compartment 452, gold nuggets are driven downstream in a given compartment 452 against the downstream barrier 440, at the upstream wall of vertical leg 444, and accumulate at and below the lowest portion of said vertical wall 444, as shown in FIG. 20.

The bottom laminar flow layer between side bars 418 occurs through the upright yieldable fingers or blades 464 which damp the flow and cause smaller gold particles contained in the flow to accumulate between the blades. The pairs of rods 420 extending transversely within the bottom laminar flow layer, one on each side of each vertical leg 444, accommodate laminar flow between compartments in the bottom layer both over and under the transverse rods 420.

As mentioned earlier, the flow to any of the troughs may be temporarily discontinued by manual rotation of either valve gate 64 or 68 in splitter 62 to temporarily shut off the flow thereto. Thereafter, gold accumulated immediately upstream of each vertical wall 444 and between the upstanding blades 464 is manually recovered and delivered to the gold house 50.

The distal or downstream end of each dynamic segregation box is illustrated as comprising a segment 97 comprising a single slot 99. In the illustrated configuration, slot 99 is constructed and associated with ancillary components so as to be substantially identical to the previously described slot 88, no further description is needed. See in particular FIG. 1. Note that secondary water is delivered to each segment 97 to flow in a confined tube, as described in conjunction with slot 88, beneath slot 99 to remove small particles of residual gold, which are caused to flow through pump 90 to one or a series of mineral jigs 92 for recovery of the gold.

The Spillway

Spent ore and carrier water mix discharged from each trough 52, 74, 76, and 78 respectively flows by gravity down a spillway 95, which may be formed of steel, into a channel shaped sump 96. FIG. 16 shows each spillway 95 as comprising a U-shaped discharge channel or chute, having a slope steeper than the slope of the portion of each trough in which the dynamic segregation box 94 is disposed. All interior wear surfaces of each spillway 95 are preferably coated with UHMWPE to extend the useful life thereof.

The Sump

The discharge down each spillway 95 dumps the spent carrier water and ore from each trough into a single sump 96. Sump 96 comprises a slotted section substantially identical to any of the previously described slotted sections 86, each of which comprises four slots 88. Secondary water from pump 84 is delivered to a tube at the underside of each slot of sump 96, such that secondary water, some carrier water, and fine particles containing micro-fine gold are collectively displaced by pump 98 to slime pond 100, as best seen in FIG. 100.

The channel-shaped sump 96 may be four feet deep, four feet wide, and eight feet long, for example, although other configurations could be used. A slope such that the end-to-end drop in elevation is about five feet is suitable.

The Sand Screw

Conventional, commercially available sand screws exist by which, as shown in FIG. 1 at site 102, the fine particles and water are separated and delivered to slime pump 106, while the other large solid particles are displaced so as to be delivered to conveyor 104 and from thence to waste pile 60. An Eagle or Torsen sludge pump available from Torgeson comprising a 40 inch diameter and a 20 foot longitudinal length is suitable.

The Slime Pump

Slime pump 106 may be any suitable commercial slurry pump such as the 12×10 slurry pump available from Ash.

The Use of UHMWPE

Figure 24:
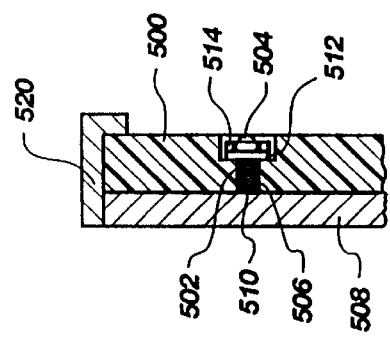
FIG. 24 is an enlarged fragmentary cross-section showing one mode by which an ultra heavy molecular weight polyethylene sheet can be installed as a liner to protect steel surfaces of the illustrated gold recovery system from wear due to displacement of hydrated ore.

As stated previously, surfaces of the system 30 subjected to abrasive wear by ore traveling therethrough are preferably lined with a layer of UHMWPE. The UHMWPE is commercially available in sheets. With reference to FIG. 24, each of these sheets 500 is predrilled to create an array of holes 502 locations for receipt of threaded studs 504. A stud welding gun is used to weld each stud 504 at its lower end 506 to the associated steel plate 508 at site 510. The length of each stud 504 is selected so that the distal end thereof is within the countersunk hole 502 with which it is associated. While not restrictive, the threaded studs 504 may a length of one inch and a ⅜ inch diameter.

Once the threaded studs 504 are appropriately welded to the associated steel sheet 508, with the layer or sheet of UHMWPE in place as illustrated in FIG. 24, a large washer 512, the diameter of which substantially exceeds the smaller of the two diameters of hole 502 is positioned as illustrated in FIG. 24 and a nut 514 is threaded onto stud 504 until it has been firmly tightened.

Where appropriate an angle 520 may be welded at the top of a vertically-directed sheet of steel 508. Where both sides of a sheet of steel are to be covered with UHMWPE, an inverted channel may be used in lieu of the angle 520.

At any point in time when it is desired to replace a used sheet of UHMWPE with another sheet of UHMWPE, the nuts 514 and washer 512 are simply removed, the used sheet 500 removed and discarded, and a new sheet 500 of UHMWPE, properly apertured, placed in the position shown in FIG. 4, following which each washer 512 and each nut 514 are again assembled on each stud 504.

The invention may be embodied in other specific forms without departing from the spirit of essential characteristics thereof. The present embodiments therefore to be considered in all respects as illustrative and are not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A placer system by which gold is recovered from ore comprising:
   gold recovery apparatus through which gold-bearing hydrated ore flows;
   a water system comprising:
      a large capacity water supply;
      water passageway structure disposed between the water supply and the gold recovery apparatus through which carrier water is continuously delivered in large quantities during operation of the apparatus;
      structure at the apparatus for delivering water spray from the carrier water against influent ore to wash surface gold from the ore and to hydrate the ore into a liquid mix;
      channel structure defining at least one flow path for the mix extending through at least part of the apparatus, at least one gold recovery site being located along said channel structure, the channel structure comprising at least one trough;
      a structure by which secondary water is delivered to said at least one gold recovery site to enhance gold recovery;
      water reclamation structure downstream of the channel structure by which water from the spent mix is salvaged and reused;
      the trough comprising a plurality of gold recovery sites.

2. A placer system by which gold is recovered from ore comprising:
   gold recovery apparatus through which gold-bearing hydrated ore flows;
   a water system comprising:
      a large capacity water supply;
      water passageway structure disposed between the water supply and the gold recovery apparatus through which carrier water is continuously delivered in large quantities during operation of the apparatus;
      structure at the apparatus for delivering water spray from the carrier water against influent ore to wash surface gold from the ore and to hydrate the ore into a liquid mix;
      channel structure defining at least one flow path for the mix extending through at least part of the apparatus, at least one gold recovery site being located along said channel structure, the channel structure comprising at least one trough;
      a structure by which secondary water is delivered to said at least one gold recovery site to enhance gold recovery;
      water reclamation structure downstream of the channel structure by which water from the spent mix is salvaged and reused;
      at least one of the gold recovery sites comprising a boil box to which secondary water is delivered via the secondary water structure for turbulating the mix to enhance separation and sedimentation of gold particles.

3. A placer system by which gold is recovered from ore comprising:
   gold recovery apparatus through which gold-bearing hydrated ore flows;
   a water system comprising:
      a large capacity water supply;
      water passageway structure disposed between the water supply and the gold recovery apparatus through which carrier water is continuously delivered in large quantities during operation of the apparatus;
      structure at the apparatus for delivering water spray from the carrier water against influent ore to wash surface gold from the ore and to hydrate the ore into a liquid mix;
      channel structure defining at least one flow path for the mix extending through at least part of the apparatus, at least one gold recovery site being located along said channel structure, the channel structure comprising at least one trough;
      a structure by which secondary water is delivered to said at least one gold recovery site to enhance gold recovery;

water reclamation structure downstream of the channel structure by which water from the spent mix is salvaged and reused;

at least one of the gold recovery sites comprising at least one slot at the bottom of the trough through which gold particles displace.

4. A placer system according to claim 3 wherein the at least one slot is diagonally oriented across the trough.

5. A placer system according to claim 3 wherein the at least one slot is associated with the secondary water structure so as to draw gold particles down into the slot.

6. A placer system by which gold is recovered from ore comprising:

gold recovery apparatus through which gold-bearing hydrated ore flows;

a water system comprising:

a large capacity water supply;

water passageway structure disposed between the water supply and the gold recovery apparatus through which carrier water is continuously delivered in large quantities during operation of the apparatus;

structure at the apparatus for delivering water spray from the carrier water against influent ore to wash surface gold from the ore and to hydrate the ore into a liquid mix;

channel structure defining at least one flow path for the mix extending through at least part of the apparatus, at least one gold recovery site being located along said channel structure, the channel structure comprising at least one trough;

a structure by which secondary water is delivered to said at least one gold recovery site to enhance gold recovery;

water reclamation structure downstream of the channel structure by which water from the spent mix is salvaged and reused;

at least one of the gold recovery sites comprising a compartmentized dynamic flow section.

7. A placer system according to claim 6 wherein the compartmentized dynamic flow section comprises a bottom region in which flow is laminar.

8. A placer system according to claim 7 wherein the bottom region comprises yieldable blades through which the laminar flow occurs and between which gold particles collect.

9. A placer system according to claim 7 wherein the bottom region comprises spaced transverse rods over and under which laminar flow occurs.

10. A placer system by which gold is recovered from ore comprising:

gold recovery apparatus through which gold-bearing hydrated ore flows;

a water system comprising:

a large capacity water supply;

water passageway structure disposed between the water supply and the gold recovery apparatus through which carrier water is continuously delivered in large quantities during operation of the apparatus;

structure at the apparatus for delivering water spray from the carrier water against influent ore to wash surface gold from the ore and to hydrate the ore into a liquid mix;

channel structure defining at least one flow path for the mix extending through at least part of the apparatus, at least one gold recovery site being located along said channel structure, the channel structure comprising at least one trough;

a structure by which secondary water is delivered to said at least one gold recovery site to enhance gold recovery;

water reclamation structure downstream of the channel structure by which water from the spent mix is salvaged and reused;

the at least one of the gold recovery sites comprising an intermediate region which is divided into successive compartments and in which the mix flows in a turbulent and revolving manner to enhance gold recovery.

11. A placer system according to claim 10 wherein a compartment is defined by spaced intermediate region barriers.

12. A placer system according to claim 11 wherein each barrier comprises a transversely disposed structural member.

13. A placer system according to claim 12 wherein each structural member comprises an angle-shaped member.

14. A placer system according to claim 11 wherein at least one yieldable cantilevered flap is connected to each barrier so as to extend downstream away from the associated barrier whereby the dynamics of flow causes the flap to oscillate up and down so as to whip the mix in the intermediate region to enhance gold recovery.

15. A placer system according to claim 14 wherein the flap when at rest is disposed at a small acute angle above the horizontal.

* * * * *